(12) United States Patent
Sturm et al.

(10) Patent No.: US 11,689,251 B1
(45) Date of Patent: Jun. 27, 2023

(54) AUTOMATED CHARACTERIZATION OF MULTIPLE-INPUT MULTIPLE-OUTPUT (MIMO) FORCE-RESPONSE PROBLEMS EMPLOYING SUBSEQUENT SINGLE-INPUT MULTIPLE-OUTPUT (SIMO) OR SINGLE-INPUT SINGLE-OUTPUT (SISO) TESTS WITH EMBEDDED INSTRUMENTATION

(71) Applicant: Robert Bosch GmbH, Stuttgart (DE)

(72) Inventors: Michael Sturm, Milford, MI (US); Kevin Wienen, Farmington Hills, MI (US); Michael Yankonis, Whitmore Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/583,619

(22) Filed: Jan. 25, 2022

(51) Int. Cl.
  *H04B 7/0413* (2017.01)
  *H04B 17/00* (2015.01)
(52) U.S. Cl.
  CPC ........ *H04B 7/0413* (2013.01); *H04B 17/0085* (2013.01)
(58) Field of Classification Search
  CPC .................. H04B 7/0413; H04B 17/0085
  See application file for complete search history.

(56) References Cited

U.S. PATENT DOCUMENTS

| | | |
|---|---|---|
| 5,434,549 A | 7/1995 | Hirabayashi et al. |
| 5,884,736 A | 3/1999 | Burdisso et al. |
| 5,979,242 A | 11/1999 | Hobbs |
| 6,002,184 A | 12/1999 | Delson et al. |
| 6,377,900 B1 | 4/2002 | Ueno et al. |
| 6,721,668 B1 | 4/2004 | Momoi et al. |
| 7,024,315 B2 | 4/2006 | Giurgiutiu |
| 7,487,679 B2 | 2/2009 | Sirrine et al. |
| 7,994,741 B2 | 8/2011 | Delson |
| 8,281,659 B2 | 10/2012 | Napolitano |
| 8,398,570 B2 | 3/2013 | Mortimer et al. |

(Continued)

OTHER PUBLICATIONS

Astratini-Enache et al., "Moving Magnet Type Actuator with Ring Magnets", Journal of Electrical Engineering, vol. 61, No. 7/s, 2010, pp. 144-147.

(Continued)

*Primary Examiner* — Rahel Guarino
(74) *Attorney, Agent, or Firm* — Michael Best & Friedrich LLP

(57) ABSTRACT

Systems and methods for automated MIMO force-response characterization of a device/structure-under-test. A SIMO exciter router is operated to selectively couple an excitation signal input to an exciter device while the sensor data indicative of a sensed response to the imparted excitation force is collected from a plurality of response sensors. The SIMO exciter router operates to collect sensor data for each of a plurality of different exciter-sensor combinations (i.e., sensor data is collected from each individual response sensor while the excitation force is applied by each individual exciter device). The sensor data is collected by a data acquisition system with a plurality of signal input channels each coupled to a different response sensor or a sensor router is used to selectively couple each individual sensor output to a shared signal input channel of the data acquisition system.

20 Claims, 14 Drawing Sheets

(56) References Cited

U.S. PATENT DOCUMENTS

| | | | |
|---|---|---|---|
| 8,408,066 | B1 | 4/2013 | Romero et al. |
| 9,331,558 | B2 | 5/2016 | Clamme |
| 10,317,373 | B2 | 6/2019 | Larkin et al. |
| 10,386,339 | B2 | 8/2019 | Zhuge et al. |
| 10,827,280 | B2 | 11/2020 | Linjama et al. |
| 2011/0239771 | A1 | 10/2011 | Wu et al. |
| 2019/0041365 | A1* | 2/2019 | Zhuge ............... G01N 29/46 |
| 2019/0120717 | A1 | 4/2019 | Gysling et al. |
| 2020/0232874 | A1 | 7/2020 | Underwood |
| 2021/0172829 | A1 | 6/2021 | Kim |

OTHER PUBLICATIONS

De Klerk, "Solving the RDoF problem in experimental dynamic substructuring", Proceedings of the XXVI International Modal Analysis Conference, 2007, 9 pages.

Elliott et al., "Moment excitation and the measurement of moment mobilities", Journal of Sound and Vibration, 20112, vol. 331, pp. 2499-2519.

International Organization for Standardization, ISO 20270: 2019 Acoustics—Characterization of sources of structureborne sound and vibration—Indirect measurement of blocked forces, 2019, 47 pages.

Meggitt et al., "On the Problem of Describing the Coupling Interface Between Sub-structures: An Experimental Test for Completeness", Computer Science, Chapter 14, 2018, pp. 171-182.

Strum et al., "Robust NVH Development of Steering Systems Using In-Situ Blocked Forces from Measurements with Low-Noise Driver Simulators", Noise-CON, 2017, 8 pages.

Van der Seijs, "Experimental Dynamic Substructuring: Analysis and design strategies for vehicle development", PhD Thesis, Technical University Delft, 2016, 209 pages.

Van der Seijs et al., "An Improved Methodology for the Virutal Point Transformatoin of Measured Frequency Response Functions in Dynamic Substructuring", 4th ECCOMAS Thematic Conference on Computational Methods in Structural Dynamics and Earthquake Engineering, 2013, pp. 4334-4347.

International Search Report for Application No. PCT/EP2023/051418 dated Mar. 28, 2023 (5 pages).

Napolitano et al., "Multiple Sline Sweep Excitation for Ground Vibration Tests," Proceedings of the IMAC-XXVII, 2009, pp. 1753-1768.

* cited by examiner

| Test Criterion | Type | Excitation | Response | SRF |
|---|---|---|---|---|
| Signal Conditioning: e.g. overload, duration, reliable frequency range (e.g., 10dB drop in force spectrum), statistical analysis (e.g., mean, range, max, min). | Individual | X | X | |
| Signal-to-Noise Ratio | Individual | | X | |
| Coherence Function (specific) | Individual | | | X |
| LTI Confirmation Test to validate linear time invariant system assumption (e.g., excitation with different magnitude scaling, Bode-plot anlaysis, etc.) | Individual | | | X |
| Driving Point Passivity | Individual | | | X |
| Reciprocity: Frequency Response Function Assurance Criterion (FRAC), Phase Assurance Criterium (PAC), SRF Reciprocity | Overall Set | | | X |
| Overall Coherence as a Single Number or Spectral Representation | Overall Set | | | X |
| Data Consistency (e.g., sensor and excitation) (specific and overall) as single number or spectral representation | Overall Set | X | X | |
| Conditioning of Response and Excitation transformation matrices as singular value spectra and rank | Overall Set | X | X | |
| Conditioning of SRF matrix (after transformation) as singular value spectrum and single value matrix rank | Overall Set | | | X |
| Contribution (using geometric data of excitation and response degrees to freedom) | Overall Set | X | | |
| On-Board Validation (OBV) with excitation applied at source side | Overall Set | X | X | X |
| Inversion Error using blocked force noise floor from excitation applied at source-side | Overall Set | | | X |
| Interface Completeness Criterion (ICC) | Overall Set | | | X |

"*Individual*" - An individual measurement of data (excitation and response signals) obtained simultaneously during an experiment with an excitation applied to a single degree of freedom (DoF). If a single response is measured, this measurement is referred to as a SISO SRF experiment. If multiple response DoFs are measured in parallell, this measurement is referred to as a SIMO SRF experiment.

"*Overall Set*" - The entity of all individual SRF SIMO or SIMO experiments is considered as the "overall set" of SRFs (i.e., all SRFs are arranged in rows and columns of the corresponding MIMO SRF matrix and the quality of this matrix is analyzed.

"*Excitation*" - Measured signal of the applied (force) excitation to which a certain quality check is applied.

"*Response*" - Measured signal of the caused (structural or acoustic) response to which a certain quality check is applied.

"*SRF*" - Determined system response function (SRF) to which a certain quality check is applied.

FIG. 9

AUTOMATED CHARACTERIZATION OF MULTIPLE-INPUT MULTIPLE-OUTPUT (MIMO) FORCE-RESPONSE PROBLEMS EMPLOYING SUBSEQUENT SINGLE-INPUT MULTIPLE-OUTPUT (SIMO) OR SINGLE-INPUT SINGLE-OUTPUT (SISO) TESTS WITH EMBEDDED INSTRUMENTATION

BACKGROUND

The present invention relates to systems and methods for testing the response of a device or structure to applied excitation (e.g., vibration) conditions.

SUMMARY

In one embodiment, the invention provides a method of automated multiple-input multiple-output (MIMO) force-response characterization of a device or structure-under-test. A plurality of exciter devices and a plurality of response sensors are coupled to the structure-under-test (either directly or indirectly via a test fixture). An exciter router is operated to iteratively couple an excitation signal input to each exciter device of the plurality of exciter devices to selectively cause an individual exciter device to impart an excitation force to the structure-under-test. Sensor data is collected from the plurality of response sensors while the excitation force is imparted. In particular, a first set of sensor data is collected from each response sensor of the plurality of response sensors while the excitation force is imparted by a first exciter device and subsequent sets of sensor data are collected from each response sensor of the plurality of response sensors while the excitation force is iteratively imparted by each additional exciter device. A MIMO system response function is then determined based on the collected sensor data. In some embodiment, response sensor data is collected in parallel by a data acquisition system with multiple input channels while, in other implementations, response sensor data is collected serially by operating a sensor router to iteratively couple each individual response sensor to a single input channel of the data acquisition system.

In another embodiment, the invention provides a test system for automated MIMO force-response characterization of a device or structure-under-test. The test system includes a plurality of exciter devices, a plurality of response sensors, a signal generator, an exciter router, a data acquisition system, and an electronic controller. The exciter router is configured to selectively couple the excitation signal generated by the signal generator to each exciter device of the plurality of exciter devices in order to cause the exciter device to impart an excitation force to the structure-under-test. The data acquisition system collects sensor data from each of the plurality of responses sensors indicative of a sensed response to the imparted excitation force. The electronic controller operates the exciter router to apply the excitation signal to a first exciter device until a first set of sensor data is collected by the data acquisition system from each response sensor of the plurality of response sensors while the excitation signal is applied by the first exciter device. The electronic controller then operates the exciter router to apply the excitation signal to each additional exciter device until additional sets of sensor data are collected by the data acquisition system from every response sensor while the excitation signal is iteratively applied to each individual exciter device.

In some implementations, the data acquisition system includes a plurality of signal input channels each coupled to a different response sensor while, in other implementations, the test system also includes a sensor router configured to selectively couple each individual sensor output to a shared signal input channel of the data acquisition system. In some implementations, the electronic controller is configured to determine a system response function for the structure-under-test by populating a system-response-function (SRF) matrix with sensor data collected for each of a plurality of different exciter-sensor combination.

In another embodiment, the invention provides a test system for automated MIMO force-response characterization of a device or structure-under-test. A SIMO exciter router with an input channel coupled to receive an excitation signal input and a plurality of excitation signal output channels each coupled to a different one of a plurality of exciter devices. An electronic controller is configured to controllably operate the SIMO exciter router to cause the SIMO exciter router to selectively apply the excitation signal input to an individual exciter device while the sensor data indicative of a sensed response to an excitation force imparted to the structure-under-test by the individual exciter device is collected from a plurality of response sensors. The electronic controller is configured to controllably operate the SIMO exciter router until sensor data is collected for each of a plurality of different exciter-sensor combinations, wherein the sensor data collected for each different exciter-sensor combination includes sensor data collected from a single response sensor while the excitation force is applied by a single exciter device. In some implementations, the sensor data is collected by a data acquisition system with a plurality of signal input channels each coupled to a different response sensor while, in other implementations, the test system also includes a sensor router configured to selectively couple each individual sensor output to a shared signal input channel of the data acquisition system.

Other aspects of the invention will become apparent by consideration of the detailed description and accompanying drawings.

BRIEF DESCRIPTION OF THE DRAWINGS

FIG. 9 is a table listing examples of data quality tests that may be performed as part of the method of FIG. 8.

DETAILED DESCRIPTION

Figure 1A:
FIG. 1A is a perspective view of a vibration testing system according to one implementation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Excitation testing may be performed on a device or structure (e.g., an automobile component) to model how the structure responds to different applied forces (e.g., sound, vibration, impact, etc.). In some implementations, testing may involve applying an excitation force to the device or structure at a first location and measuring a response at a second location. For example, a vibrational force may be applied at a first location and an acceleration measured at another location. The difference between the applied excitation force and the measured response is indicative of the system response. In other implementations, the force excitation and the response measurement can be collocated (e.g., the exciter device is mounted on an accelerometer that, in turn, connects to the structure-under-test (see, e.g., FIG. 4, sensor 107A below)) to capture a driving point SRF measurement.

To approach structure-borne sound and vibration problems in their full complexity (e.g. multi-path and multi-degrees of freedom (DoF) systems), characterization of the structural dynamic properties of machinery is of great importance. Although feasible for simple structures, exact numerical modelling of the structural and/or vibro-acoustic properties is still difficult for most complex technical components and assemblies. Instead, in some implementations, their dynamic behavior may be characterized experimentally by means of system response function (SRF) measurements, for example, as employed during modal testing. The nature of system response functions (SRF) can be rather generic and may comprise structural, acoustic, vibro-acoustic or other descriptions of the structure's propagating properties (e.g. hydraulic (fluid) pressure response to an imparted force excitation). In addition, SRFs may be expressed in the time domain, the modal domain, the state space domain, the physical domain, or the frequency domain. One particular example of a method to determine SRFs is the measurement of frequency response functions (FRF), such as compliance, mobility, or accelerance.

Experimentally, FRFs can be determined by employing some sort of force-excitation to pre-determined input degrees of freedom (DoFs) and measuring the resulting system response(s) at one or more spatial observer-DoFs. For example, instrumented hammers (modal hammers) and/or vibration shakers can be used as excitation sources to provide an external force-excitation to the structure and a kinematic sensor (e.g., a displacement probe, velocity sensor, and/or accelerometer) is used to capture at least one system response per excitation test. Other types of sensors may be used to account for other types of system responses such as sound pressure as in the case of vibro-acoustic FRF measurement.

For simple FRF testing (e.g., where the set up & complexity of the instrumentation is relatively simple and the number of SRFs to be measured are small), experiments can be performed manually—for example, with all measurement equipment being installed prior to the first measurement and all FRFs being measured in parallel. Alternatively, for more sophisticated structures or cases with limited availability of measurement equipment, experiments may be carried out in a "roving instrumentation" manner in which at least some of the exciters and/or the sensors are moved to different locations after every excitation test. Related measurement techniques may be referred to as "roving exciter (hammer, shaker)", or "roving sensor (accelerometer etc.)" experiments. Roving instrumentation techniques are beneficial in terms of costs and/or the availability of required equipment. Not only can these techniques drastically reduce the number of required exciters and/or sensors, but they can also be performed with low-channel-count DAQ systems. However, some drawbacks of roving instrumentation tests include: (1) increasing measurement time and effort with increasing complexity of the structure under test; (2) introduction of experimental errors due to the need of repositioning instrumentation between the different tests (e.g. consistent positioning of equipment, proper attachment/application of the force-excitation, proper alignment of excitation/response DoFs etc.); and (3) increased susceptibility to errors during the subsequent manual data processing steps and the lack of automated synchronization between data collection and data post-processing steps.

For these reasons, in some implementations, SRF testing on more sophisticated multiple-input, multiple-output (MIMO) systems are conducted in a partially or fully automated way with all required measurement equipment being installed on the test structure before the measurement starts. In some implementations, the FRF measurement is then conducted simultaneously for all responses and force-excitation DoFs. Simultaneous measurement greatly reduces data collection time, but, unfortunately, the reduced data collection time comes at the expense of higher equipment costs required for high-channel-count DAQ systems to acquire all force-excitations and system responses in parallel as well as the flexibility to excite the structure with arbitrary excitation functions (e.g. swept sine, random noise, impact, etc.) in order to employ multi-reference FRF post-processing methods.

In some implementations, such "automated" simultaneous FRF measurement approaches may utilize specifically-designed excitation sequences and associated post-processing methods such as multi-reference random methods (e.g. burst random excitation) and/or vibration testing using multiple sine sweep excitation. These types of methods may be utilized, for example, in instrumentation-intensive experimental studies such as ground vibration testing of aircrafts, in which the measurement equipment is installed directly on the test structure and dismantled after a test is completed. Thus, the data collection time for a "single specimen" SRF measurement is relatively small compared to the total testing time that includes time for the preparation of the measurement and instrumentation, data collection time, data post-processing steps, and time to dismantle the measurement equipment after the test. Similar considerations are valid for similarly sophisticated but dimensionally more compact structures such as automotive components and/or component assemblies (e.g., electric power steering (EPS) systems, transmission gear boxes, engines, etc.). However, automotive applications may require vibration tests conducted repeatedly on multiple parts in order to evaluate the overall noise-vibration-harshness ("NVH") performance on a statistically relevant number of test specimen. These "multiple specimen" SRF measurements would greatly benefit from improved SRF measurement techniques that can quickly and efficiently collect high-quality SRF data in a fully automated manner without the need of labor-intensive instrumentation steps and/or costly DAQ systems to provide a sufficient number of separate measurement channels.

FIG. 1A illustrates an example of a SRF test system 100. A fixture 101 includes two arms configured to hold a device/structure-under-test 103. In the example of FIG. 1A, the fixture 101 is configured to hold an electric power steering system for SRF testing. A plurality of excitation units 105 are configured to controllably apply an excitation force to the device/structure-under-test 103 and are coupled to the device/structure-under-test 103 either directly or indirectly by being coupled to the fixture 101 which is, in turn, coupled to the device/structure-under-test 103. Similarly, a plurality of response sensors 107 (e.g., accelerometers) are also coupled to the device/structure-under-test (either directly or indirectly).

Figure 1B:
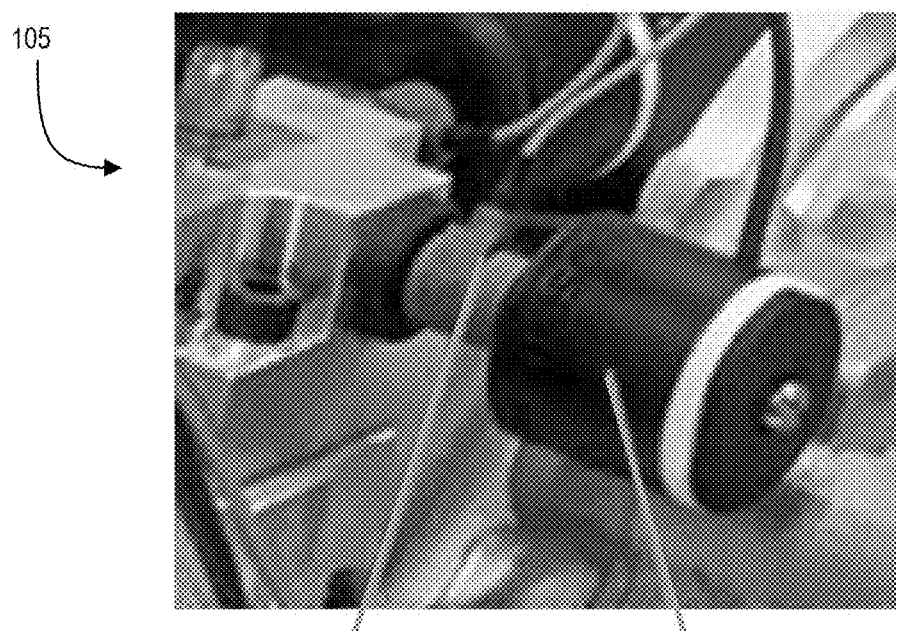
FIG. 1B is a perspective view of an exciter device of the vibration testing system of FIG. 1A.
Figure 1C:
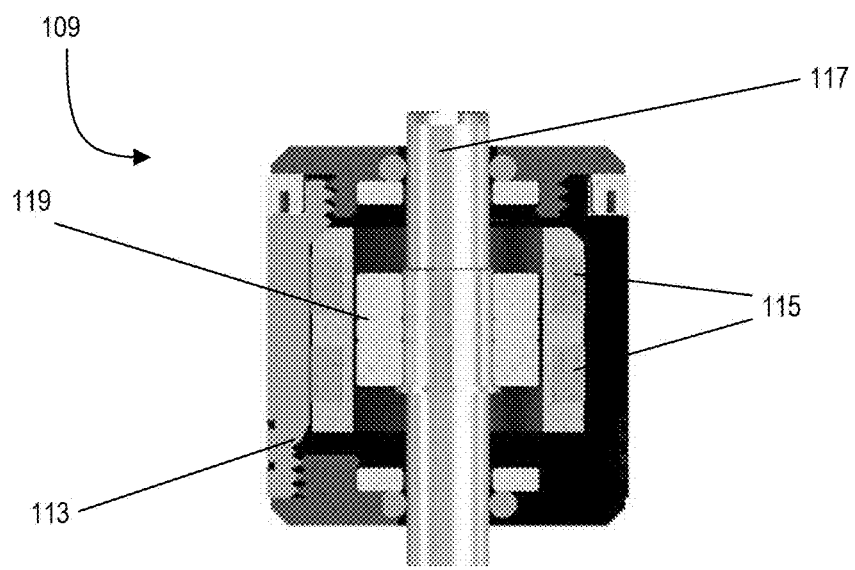
FIG. 1C is a cross-sectional view of the exciter device of FIG. 1B.

As illustrated in further detail in FIG. 1B, each excitation unit 105 in the example of FIG. 1A includes a vibratory exciter 109 (i.e., a "shaker") and a load cell 111. As shown in FIG. 1C, the vibratory exciter 109 is a magnetically-actuated exciter device that includes a cylindrical body 113 with a pair of electromagnet coils 115 coupled to the cylindrical body 113. A piston 117 (e.g., also called a "table") with a permanent ring magnet 119 mounted thereto is positioned at least partially within the cylindrical body 113 without being fixedly coupled to the cylindrical body 113. Accordingly, a magnetic field controllably applied by the electromagnet coils 115 interacts with the permanent ring magnet(s) 119 to cause movement of the cylindrical body 113 relative to the piston 117. For example, when one end of the piston 117 is coupled to the device/structure-under-test 103 and an alternating electrical current is applied to the electromagnet coil 115, the resulting alternating magnetic field causes a corresponding alternating movement of the cylindrical body 113 relative to the piston 117, which, in turn, results in a controllable vibrational force applied to the device/structure-under-test 103 through the piston 117. The amplitude and frequency of the applied vibrational force can be adjusted and regulated by controlling the amplitude and frequency of the electrical current that is applied to the electromagnet coils 115 which, in turn, controls the amplitude and frequency of the magnetic field applied by the electromagnet coils 115 to the permanent ring magnet 119. Although the example of FIGS. 1A through 1C illustrate the use of vibratory exciters 109, in some implementations other types of exciter devices may be used instead of or in addition to the vibratory exciters 109. Exciter devices may include mechanical or electromechanical devices configured to apply a vibrating, pulsating, oscillatory, transient, or other dynamically changing force such as, for example, speakers, rotating eccentric mass actuators, electric motors, solenoid actuators, piezoelectric actuators, or any other actuation mechanism that can dynamically excite a physical structure.

Accordingly, an exciter device such as the vibratory exciter 109 is used to generate a "known" dynamic force input to the device/structure-under-test 103 and, as described in further detail below, the force/load generated by the excitation source and imparted to the device/structure-under-test 103 can be used as a reference signal to calculate system response function (SRFs) in the data post-processing step. The actual dynamic force/load applied by the exciter device (e.g., vibratory exciter 109) is measured, for example, using the load cell 111 that is coupled between the exciter device and the device/structure-under-test 103 (as illustrated in FIG. 1B). In other implementations, other mechanisms for measuring the applied excitation force may be used including, for example, one or more force transducers embedded inside the excitation source. Other techniques and methods may also be used to determine the actual dynamic force excitation imparted to the device/structure-under-test 103 including, for example, inverse measurement techniques (e.g., inverse force synthesis), model-based force reconstruction methods (e.g., analytical, numerical, experimental, and/or hybrid approaches), or the measurement of other load-indicative quantities (e.g., current, voltage, strain, etc.) mapped (e.g., mathematically) onto the force/load excitation space. In the examples described herein, the term "load" is a generalization of the term "force" to account for other types of dynamic excitations that might be applied to a device/structure-under-test 103 such as, for example, sound pressure (for acoustic exciters).

The response sensors 107 are configured to sense/determine the actual response of the device/structure-under-test 103 to the dynamic force excitation imparted by one or more exciter devices (e.g., vibratory exciters 109). In some implementations, the response sensors 107 may be considered as dynamic transducers mechanically coupled to the device/structure-under-test. The response sensors 107 measure the manner in which the device/structure-under-test 103 (and any test bench components coupled thereto such as, for example, the fixtures 101) responds to the excitation signal. The response sensors 107 provide signals and/or data representing the output response to the connected data acquisition system (as described further below). Depending on the type of system response function (SRF) to be determined, different types of sensors may be used including, for example, accelerometers and/or microphones. In the example of FIG. 1A, the response sensors 107 include accelerometers. In some other implementations, the test system 100 may be configured to measure/determine the response of the device/structure-under-test 103 without mechanically-coupled sensors by using contactless sensors such as, for example, laser-based measurement devices. In some implementations, the response of the device/structure-under-test may be determined at some locations without physical instrumentation, for example, by using system equivalent model mixing.

Figure 2:
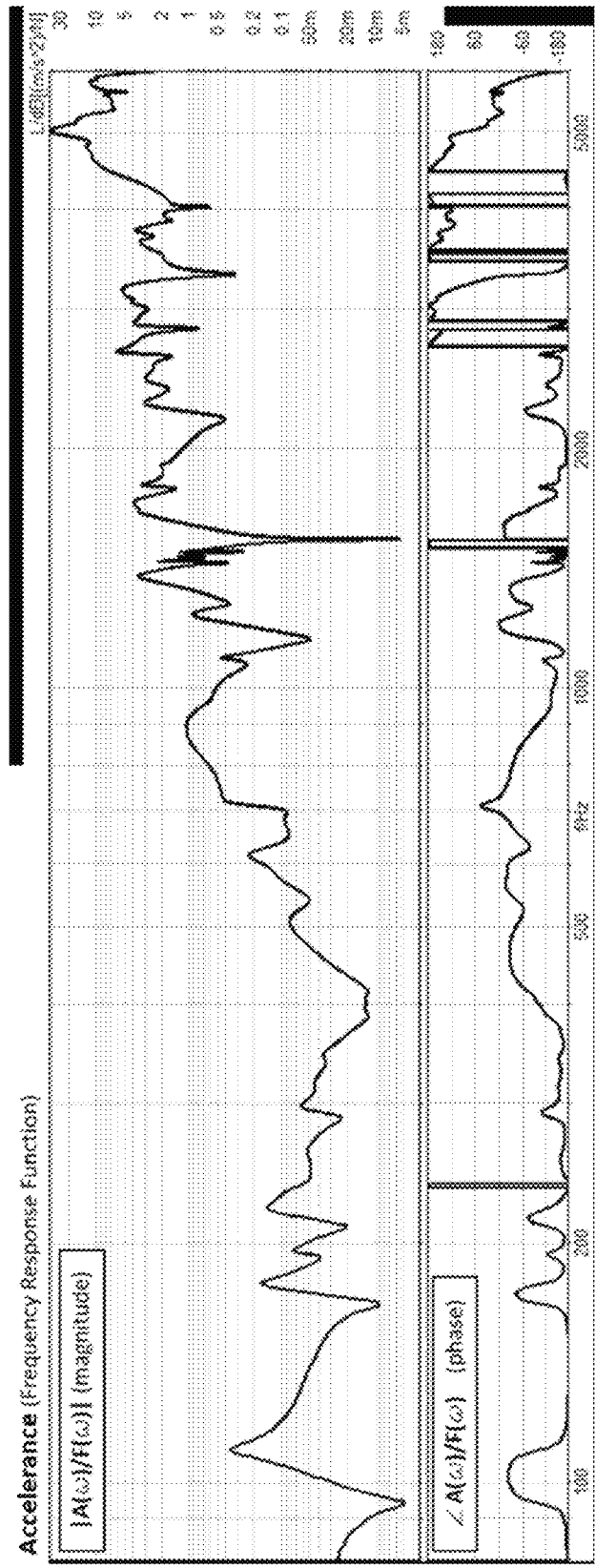
FIG. 2 is a graph of a frequency response function measured by the system of FIG. 1A expressed as a frequency dependent accelerance function.

As illustrated in FIG. 2, in some implementations, a frequency response function between two locations (e.g., the location of a vibratory exciter 109 and the location of a response sensor 107) can be defined as the "accelerance" or, in other words, a ratio between a frequency-domain representation of the measured acceleration response and a frequency-domain representation of the applied dynamic force. FIG. 2 illustrates the frequency response function as both a magnitude and a phase as a function of frequency (i.e., a frequency dependent accelerance function (A/F)).

Figure 3:
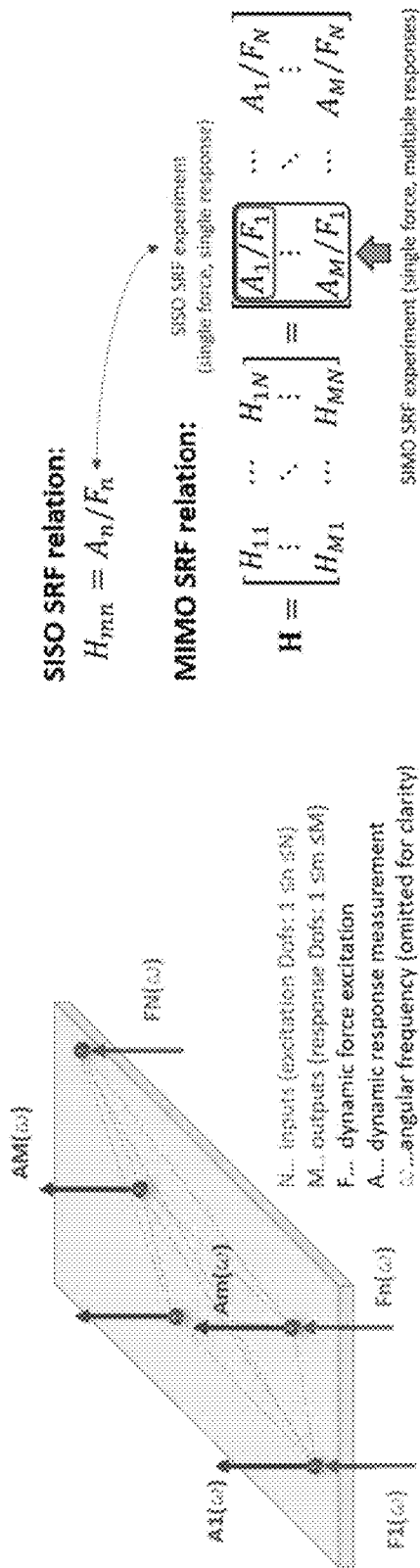
FIG. 3 is a schematic diagram of a mathematical relation of multiple-input, multiple-output (MIMO) system responses function (SRF) measurement and the corresponding MIMO SRF matrix.

As further illustrated in FIG. 3, several different frequency response functions can be calculated for a device/structure-under-test by calculating the accelerance between different combinations of inputs (i.e., an applied dynamic excitation force) and outputs (i.e., a response acceleration). The schematic on the left of FIG. 3 illustrates a simplified example of a plate-like structure with a plurality of input forces (F) and a plurality of output responses (A). Each input and output provide another degree-of-freedom. In order to characterize the structure's ability to propagate structure-borne energy between input and output degrees of freedom (DoFs), a complex network of SRFs is measured/determined. In this example, the test structure is assumed to be linear and time invariant and, therefore, the SRF characterization can be performed simultaneously. Alternatively, the SRF characterization can be performed as a series of subsequent measurements applying one excitation at an input DoF at a time and observing the associated dynamic response. In some implementations (as described in further detail below), the associate dynamic response for each input DoF is also measured one-at-a-time (SISO) while, in other implementations, multiple output DoFs are measured simultaneously (SIMO).

FIG. 3 also illustrates an example of how a complete MIMO SRF matrix can be recomposed from individual SISO or SIMO SRF experiments. In SISO experiments, every entry in the MIMO matrix corresponds to a separate measurement while, in SIMO experiments, an entire column of the MIMO SRF matrix can be populated at the same time. For this reason, no additional assumptions are imposed in regards to the utilized force excitation in order to achieve proper reference signals required to build the mathematical SRF ratios defined in the complex number space.

Figure 4:
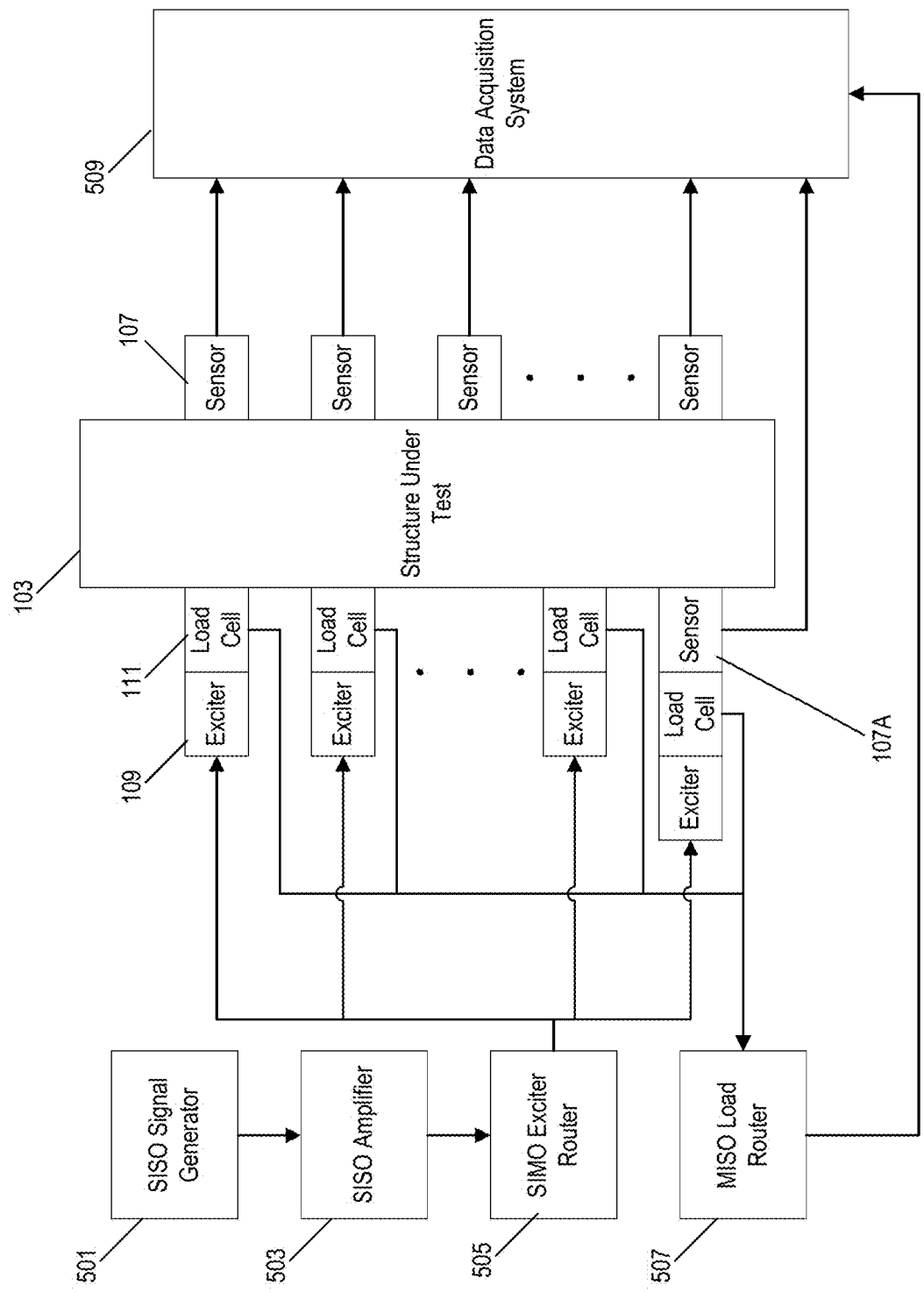
FIG. 4 is a block diagram of a control system for the testing system of FIG. 1A configured to perform MIMO system vibration tests by sequentially carrying out single-input, multiple-output (SIMO) SRF data collection and processing.
Figure 5:
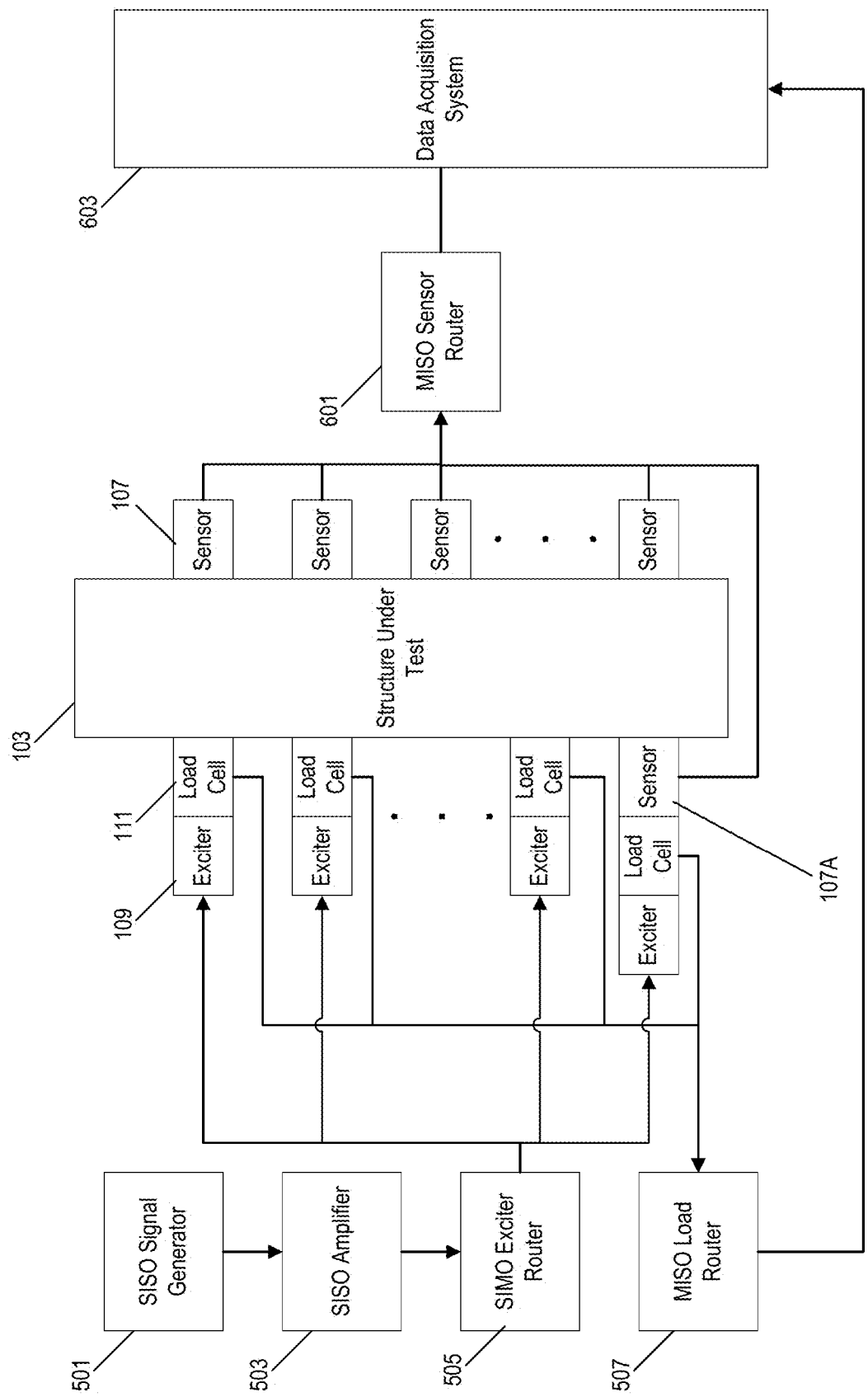
FIG. 5 is a block diagram of a control system for the testing system of FIG. 1A configured to perform MIMO system vibration tests by sequentially carrying out single-input, single-output (SISO) SRF data collection and processing.

FIGS. 4 and 5 illustrates examples of systems configured to perform fully automated system response function (SRF) measurements including, for example, structural and vibro-acoustic frequency response functions (FRFs) for sophisticated multiple-input, multiple-output (MIMO) vibration problems. In particular, these systems are configured to conduct sophisticated MIMO SRF measurements by sequentially carrying out single-input, multiple-output (SIMO) data collection (as illustrated in FIG. 4) and single-input, single-output (SISO) SRF data collection (as illustrated in FIG. 5). Post-processing routines are then applied to the collected data to recompose the associated data to obtain the complete MIMO SRF measurement, for example, by populating the MIMO SRF matrix illustrated in FIG. 3.

In both examples (FIG. 4 and FIG. 5), the test system includes a single-channel (SISO) signal generator 501 configured to provide a continuous, transient, and/or other type of dynamic signals. The SISO signal generator 501 is coupled to a SISO power amplifier 503 that is configured to output a properly conditioned driver signal. The driver signal is then routed one-at-a-time to each vibratory exciter 109 by a SIMO exciter router 505. The SIMO exciter router 505 includes a configuration of controllable switching devices and/or other control logic configured to selectively couple the output from the SISO power amplifier 503 to a different one of the plurality of vibratory exciters 109 during each vibration test in a series of vibration tests while electronically isolating the other unused vibratory exciters 109 to ensure optimal signal/data conditioning and quality. As described above, each vibratory exciter 109 in this example is coupled to a load cell 111 to determine the actual dynamic load imparted to the device/structure-under-test 103 by the "operational" vibratory exciter 109.

The plurality of load cells 111 are all communicatively coupled to a MISO load router 507, which is configured to electronically and/or digitally (if numerical methods are used to determine the actual force excitation) connect the "operational" load cell 111 (i.e., the load cell 111 coupled to the currently "operational" vibratory exciter 109) to a single input channel of a data acquisition system 509/603 and to electronically isolate the other unused load cells 111. The MISO load router 507 helps to ensure optimal signal/data conditioning and quality while also reducing the required number of data acquisition input channels for the data acquisition system 509/603.

During SRF testing using the system of FIG. 4 or FIG. 5, the operational vibratory exciter 109 generates dynamic forces so that vibrations are imparted to the device/structure-under-test 103 and any structures connected thereto (e.g., fixtures 101). The provided structure-borne energy then is propagated through different paths of (and radiated by) the coupled device/structure-under-test 103 causing a kinematic response at each of the multiple response locations (each location providing an additional response DoF for the SRF experiment). The kinematic response at each different location is measured by a corresponding response sensor 107 of a plurality of response sensors 107. In the example of FIG. 4, each response sensor 107 of the plurality of sensors is coupled to a different input channel of a data acquisition system 509 and, accordingly, the output of the plurality of response sensors 107 are measured in parallel to the measurement from a single load cell 111 during each data collection step. However, in the example of FIG. 5, each response sensor 107 is coupled to a MISO sensor router 601. The MISO sensor router 601 is configured to electronically and/or digitally (if numeral methods are used to determine responses) connect a single response sensor 107 to the data acquisition system 603 and to electronically isolate the other unused response sensors 107. Accordingly, a plurality of response sensors 107 can be selectively and controllably coupled to the same input channel of the data acquisition system 603 thereby reducing a number of required input channels. In another implementation, multiple MISO sensor routers 601 may be used to simultaneously measure the responses from a subset of the used response sensors 107. In such cases, the data acquisition system 603 may include multiple channels to measure a subset of sensors 107 in parallel, but does not require a data acquisition system 603 with enough input channels to measure all sensors 107 simultaneously.

Figure 6:
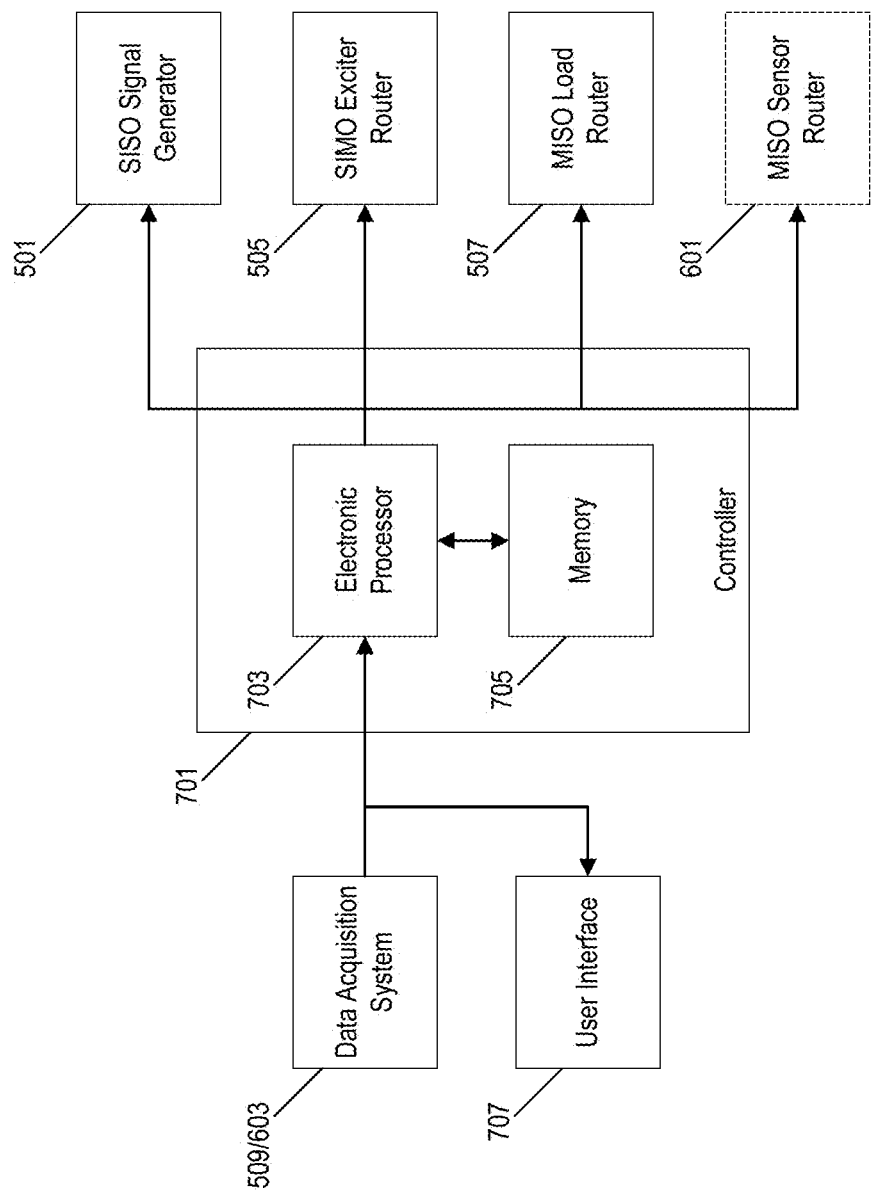
FIG. 6 is a block diagram of a control unit for the control system of FIG. 4 and/or FIG. 5.

As illustrated in FIG. 6, a controller 701 includes an electronic processor 703 and one or more non-transitory computer-readable memories 705. The memory 705 stores data (e.g., data collected from the sensors during the SRF experiments) and computer-executable instructions that are accessed and executed by the electronic processor 703 to provide the functionality of the controller 701 including, for example, the functionality as described herein. The controller 701 is communicative coupled to the data acquisition system 509/603 of the systems of FIGS. 4 and 5, respectively, and is configured to receive the response signal data collected during the SRF experiments. The controller 701 is also communicatively coupled to the SISO signal generator 501 and is configured to generate control signals that define and/or modify the signal generated by the SISO signal generator 501. The controller 701 is also communicatively coupled to the SIMO exciter router 505 and the MISO load router 507 and is configured to transmit control signals to the routers 505, 507 to selectively control which vibratory exciter 109 is coupled to receive the excitation signal and which corresponding load cell 111 is coupled to the input channel of the data acquisition system 509/603. Similarly, in the system of FIG. 5, the controller 701 is coupled to the MISO sensor router 601 and is configured to transmit control signals to the MISO sensor router 601 to selectively control which response sensor 107 is coupled to the input channel of the data acquisition system 509/603.

Figure 7:
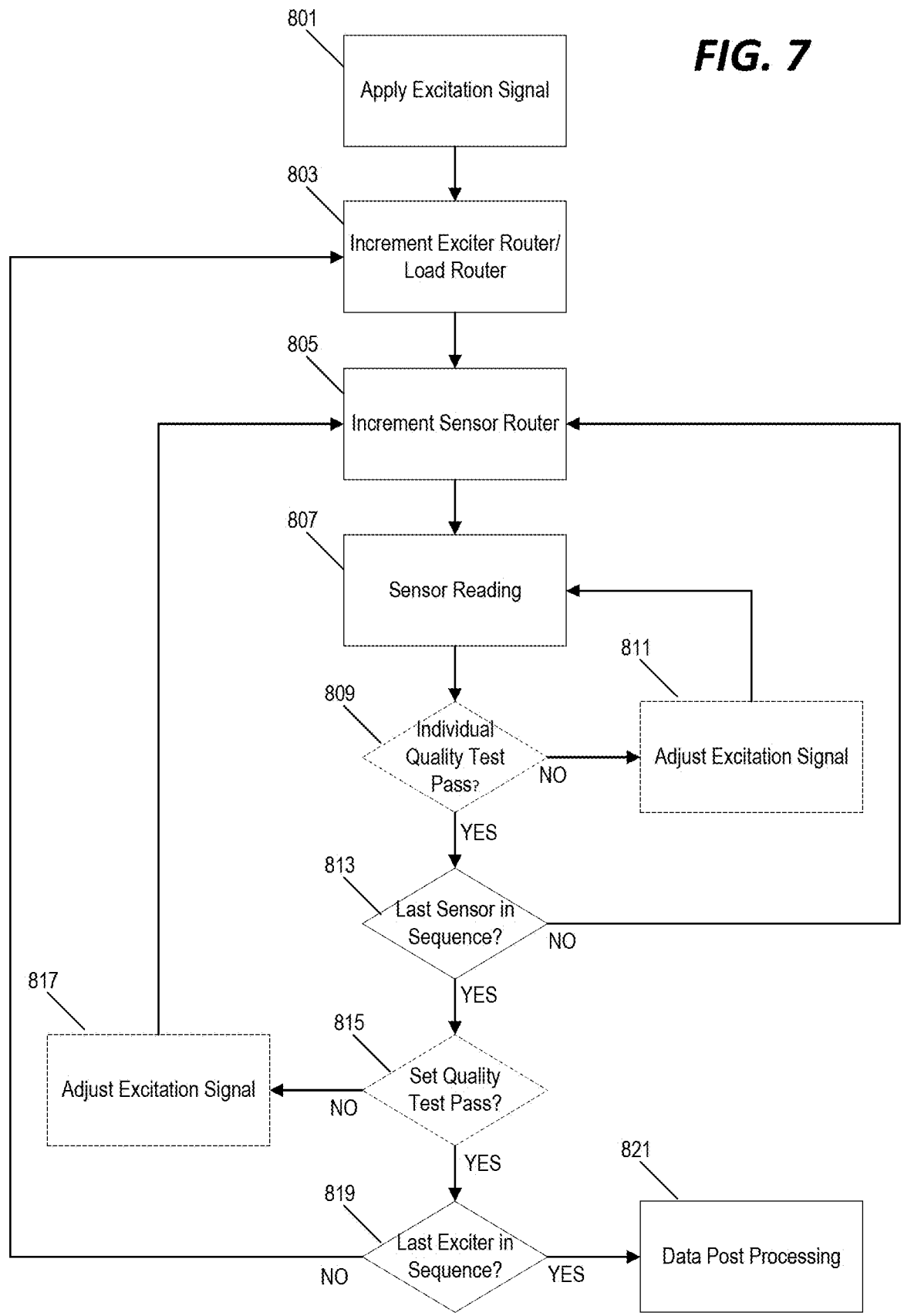
FIG. 7 is a flowchart of a method for performing SISO SRF data collection and processing using the control system of FIG. 5 and the control unit of FIG. 6.

FIG. 7 illustrates a method performed by the controller 701 for operating the system of FIG. 5 to perform a multiple-input, multiple-output (MIMO) system vibration tests by sequentially carrying out a plurality of single-input, single-output (SISO) data collection and processing routines. The controller 701 causes the SISO signal generator 501 to generate an excitation signal (step 801). The controller then causes the SIMO exciter router 505 to couple the excitation signal to a first vibratory exciter 109 and causes the MISO load router 507 to couple a first load cell 111 to a load cell input channel of the data acquisition system 603 (step 803). Similarly, the controller causes the MISO sensor router 601 to couple a first response sensor 107 to the response input channel of the data acquisition system 603 (step 805).

With the first vibratory exciter 109 coupled to receive the excitation signal and the first load cell 111 & the first response sensor 107 coupled to the respective input channels of the data acquisition system 603, the controller 701 then begins to collect and store data from the data acquisition system (step 807). In some implementations, the controller 701 is configured to use a trigger mechanism to wait until one or more pre-defined conditions are satisfied before recording the received data. Triggers may be employed to control data capturing based on detection of certain events in the applied or sensed vibration, or another type of signal. Examples may include exceedance of a certain force level when applying an excitation with an impact hammer or shaker during modal testing, exceeding or undergoing a certain vibration level.

In some implementations, the data acquisition system 603 is configured to utilize a trigger mechanism so that the data acquisition and processing will not start (or stop) until some signal level (e.g., voltage) is detected in an input channel. After the trigger is armed, the controller 701 will be initialized to wait for the signal event to occur (e.g., raising flank of trigger signal exceeding 50% of maximum channel range) before acquiring/storing data and/or to continue storing data received from the data acquisition system 603 until a pre-defined stop-condition is met. In some implementations, the stop-condition is defined as a duration (e.g., the controller 701 stores 5 seconds worth of data beginning when the signal event is detected) or another stop-trigger criterion (e.g., falling flank of trigger signal falls below 50% of maximum channel range). In some implementations, triggering can be set up so as to automatically re-arm after each trigger so that several measurements can be performed one after the other (for example, to automate gathering and storing of multiple measurements).

In some implementations, the controller 701 is configured to utilize a trigger that is controlled based on the ability of the device/structure-under-test 103 to vibrate in response to an applied vibration. For example, it may take a device/structure-under-test 103 some time to respond to an applied excitation in a sufficiently linear manner. Accordingly, beginning data acquisition at the same time that the excitation signal is applied to a vibratory exciter 109 will not provide high-quality SRF data. Instead, the trigger start event may be configured to delay data acquisition with respect to the excitation start time; thus, giving the device/structure-under-test 103 more time to respond before the measurement is started. The same applies for a triggered stop of the measurement. If the measurement is stopped at the same time that a vibratory exciter 109 is disconnect from the excitation signal, then structure may still not be able to respond to the most recent excitation signal. Instead, the controller 701 may be configured, in some implementations, to stop the measurement while the excitation signal is still being applied to the vibratory exciter 109. This stop-condition triggering also prevents the non-linear behavior of the vibratory exciter 109 during an abrupt start or stop from spoiling the measurement altogether. In some implementations, the synchronization trigger(s) may be performed automatically by control logic based on the excitation type, the frequency range, or other test-specific criteria.

Returning to the method of FIG. 7, after the data from the coupled response sensor is read and stored to the memory 705, the controller 701 increments the MISO sensor router 601 to couple the next response sensor 107 to the response input channel of the data acquisition system 603 (step 805). Accordingly, this process of collecting response sensor data (step 807) and incrementing the MISO sensor router 601 (step 805) is repeated until sensor data has been captured from each response sensor 107 (step 813) while the excitation signal is applied by the same individual vibratory exciter 109. After sensor data has been collected by every response sensor 107 in the sequence (step 813), the controller 701 increments the SIMO exciter router 505 and the MISO load router 507 (step 803) causing the excitation signal to be applied to a different vibratory exciter 109. In this example, when the SIMO exciter router 505 and the MISO load router 507 are incremented to apply the excitation signal to a different vibratory exciter 109, the increments of the MISO sensor router 601 are reset to being capturing sensor data from the first sensor in the sequence. This process continues until the excitation signal has been applied to every vibratory exciter 109 and sensor data is recorded from each response sensor 107 while the excitation signal is applied to the vibratory exciter 109.

For example, consider an arrangement where three vibratory exciters 109 and three response sensors 107 are coupled to a device/structure-under-test 103. The controller 701 would apply the excitation signal to the first vibratory exciter 109 and collect sensor data from each of the three response sensors 107. The controller 701 would then apply the excitation signal to the second vibratory exciter 109 and again collect sensor data from each of the three response sensors 107. Finally, the controller 701 would apply the excitation signal to the third vibratory exciter 109 and again collect sensor data from each of the three response sensors 107. Accordingly, the controller 701 would capture nine different sets of sensor data—one for each possible different combination of vibratory exciter 109 and response sensor 107.

When sensor data has been recorded for every response sensor 107 in the sequence (step 813) while the excitation signal is applied to the last vibratory exciter 109 in the sequence (step 819), one or more post-processing routines is applied to the collected data (step 821) to recompose and/or update the associated MIMO SRF model/measurement indicative of the dynamic behavior of the overall device/structure-under-test 103. For example, in some implementations, the controller 701 is configured to populate a MIMO SRF matrix using the frequency response function (FRF) for each different combination of vibratory exciter 109/load cell 111 and response sensor 107 as illustrated in FIG. 3 above.

In some implementations, in order to ensure consistently high data quality, the data acquisition system (DAQ) works with the controller 701 to receive proper parameterization before each individual measurement (or, in some implementations, before each group or sequence of measurements). The DAQ itself may be configured to provide advanced functionality (formulae/algorithm) to properly condition the individual transducers (e.g., load cells 111 and response sensors 107) connected to each DAQ measurement channels. In some implementations, the DAQ provide functions to automatically adjust the range settings based on the "strength" of an incoming measurement signal. This process is may be referred to as "autorange" and, in some implementations, is fully automated by the DAQ to be performed immediately before the measurement is taken. This may be done, for example, by operating one or more exciter devices 109 under conditions at which it generates the highest vibration levels for a period of time (e.g., a couple of seconds) while sensing and adjusting the connected sensor signals in such a way that no unwanted overloading (clipping) appears. The aim of parameterization procedures such as "autorange" is to maximize the sensitivity of the measurement chain (transducer, cables, DAQ) without negatively affecting data quality. For example, in some implementations, the DAQ system is configured to measure input signals of +/−5V (discretized by 24-bit) which corresponds to a vibration amplitude (e.g. 10 m/s$^2$). For small vibration amplitudes (e.g. 1 m/s$^2$) the effective range observed by the DAQ is reduced to +/−1V (autorange). In this case, the 24-bit resolution remains the same for a higher measurement accuracy (e.g. clearer distinction between signal and the sensitivity threshold of the measurement equipment). In some implementations, the DAQ features communication and/or control interfaces to allow communication with other type of equipment through compatible protocols, such as serial bus, Ethernet, USB or other communication interfaces.

In some implementations, the controller 701 is also configured to analyze the data received from the load cells 111 and/or the response sensors 107 to determine whether the captured data meets certain data quality conditions. In response to determining that the data captured for a particular response sensor 107, load cell 111, or various combinations thereof do not meet the data quality conditions, the controller 701 is configured to repeat the data collection for one or more combinations of vibratory exciter 109 and response sensor 107. In some implementations, the controller 701 may repeat the data collection by applying the same excitation signal to the vibratory exciter 109 and collecting the data from the response sensor 107. In some implementations, the controller 701 may be configured to adjust the excitation signal that is applied to the vibratory exciter 109 in addition to or instead of repeating the data collection with the same excitation signal that was applied previously.

For example, as illustrated in FIG., the controller 701 may be configured to apply one or more quality tests (step 809) to the collected sensor data after each sensor reading step (step 807). As described in further detail below, in some implementations, the quality tests may be designed to analyze the data for an individual vibratory exciter 109/response sensor 107 combination and, in other implementations, the quality tests may be designed to analyze the data for the vibratory exciter 109/response sensor 107 combination relative to sensor data collected for other vibratory exciter 109/response sensor 107 combinations.

As also illustrated in the example of FIG. 7, in some implementations, the controller 701 is also configured to apply one or more quality tests (step 815) after collecting data from all of the sensors in the sequence with the excitation signal applied by the same vibratory exciter 109 in addition to or instead of applying the one or more quality tests after each response sensor reading (step 809). In other words, the one or more quality tests (step 815) are applied before incrementing the SIMO exciter router 505 and the MISO load router 507 (step 803) to apply the excitation signal to the next vibratory exciter 109 and to connect the corresponding load cell 111 to the data acquisition system 603. Again, in some implementations, in response to determining that the collected data fails one or more of the quality tests (step 815), the controller 701 is configured to adjust the excitation signal applied to the vibratory exciter 109 (step 817) and repeats the data collection from one or more of the response sensors in the sequence before proceeding to the next vibratory exciter 109.

Additionally, in some implementations, the controller 701 may be configured to apply one or more quality tests to the collected data after collecting all of the SRF data (i.e., after collecting the data from every vibratory exciter 109/response sensor 107 combination) in addition to or instead of the quality checks performed after each individual sensor reading and after each complete sequence of sensor readings. Furthermore, in some implementations, as described above, the controller 701 is configured to transmit control signals to the SIMO exciter router 505, the MISO load router 507, and the MISO sensor router 601 and, thereby, is able to selectively activate any particular combination of vibratory exciter 109 and response sensor 107. Accordingly, in some implementations, the controller 701 is configured to analyze the captured data after collecting data for all of the vibratory exciter 109/response sensor 107 combinations, identify one or more combination that does not meet the data quality conditions, and to repeat the data collection for only those combinations that are identified as having insufficient data quality. In some implementations, the data collection for these deficient combinations is performed by adjusting the excitation signal, operating the SIMO exciter router 505 to couple the adjust excitation signal to the identified vibratory exciter 109 of the combination with the deficient data, operating the MISO sensor router 601 to couple the identified response sensor 107 of the combination with the deficient data to the response input channel of the data acquisition system 603, and then collecting the data from the coupled response sensor 107. This process is then repeated for each combination that has been identified as having insufficient data quality.

Figure 8:
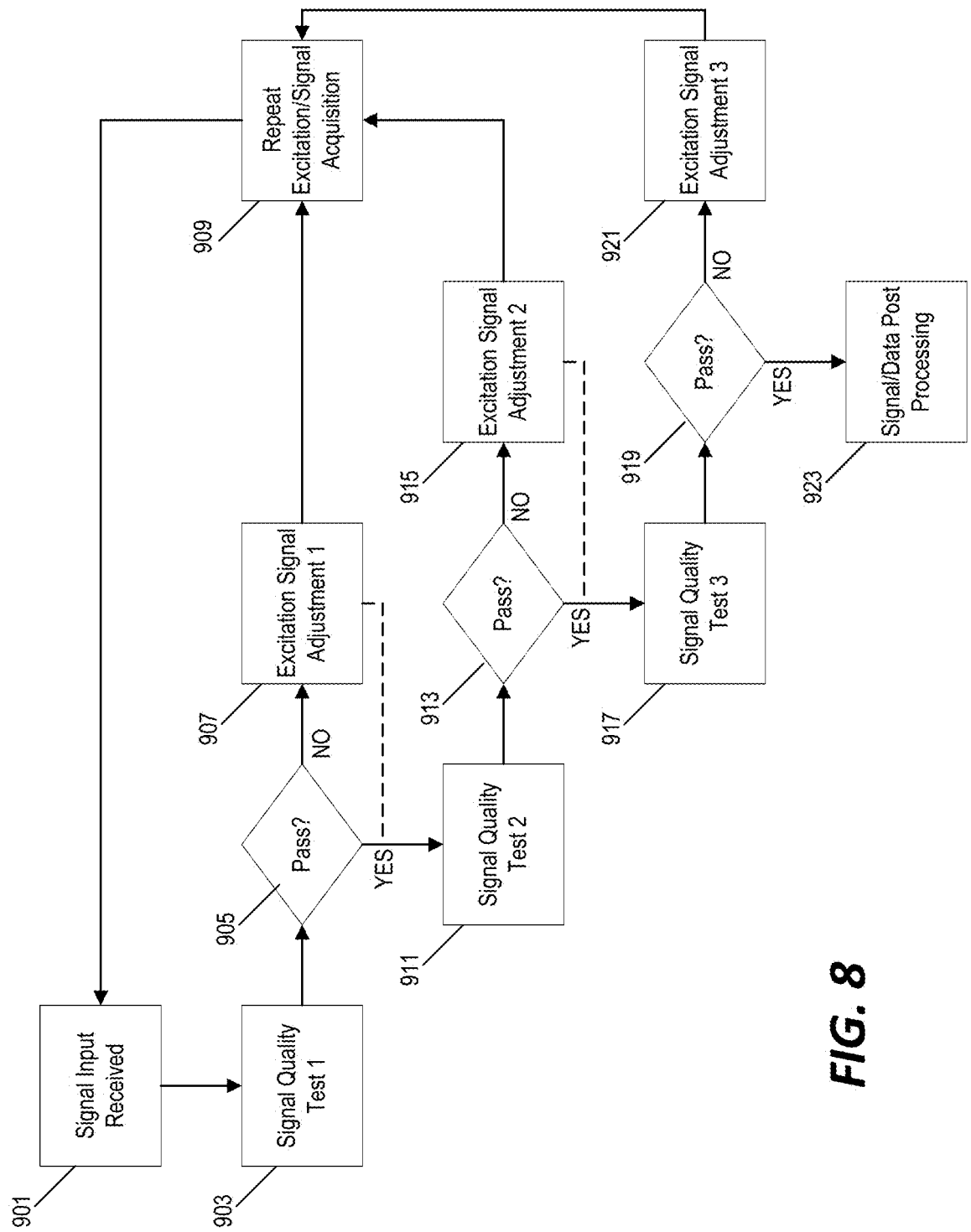
FIG. 8 is a flowchart of a method for analyzing the quality of data collected while performing the method of FIG. 7.

As described above, in some implementations, multiple data quality checks may be applied to the collected data at the same time (i.e., after data is collected from an individual sensor, after data is collected from the entire sequence of sensors, and/or after data is collected from all vibratory exciter 109/response sensor 107 combinations). FIG. 8 illustrates an example of a method performed by the controller 701 to apply multiple different quality tests to the collected data. After the input data is received (step 901) (e.g., from one or more the load cells 111 and/or more response sensors 107), the controller 701 applies a first signal quality test (step 903). If the collected data does not pass the first signal quality test (step 905), then a first adjustment is applied to the excitation signal (step 907) and the data acquisition is repeated (step 909). However, if the collected data passes the first signal quality test (step 905), then the controller 701 proceeds to apply a second signal quality test (step 911). Again, if the collected data does not pass the second signal quality test (step 913), then a second adjustment is applied to the excitation signal (step 915) and the data acquisition is repeated (step 909). However, if the collected data passes the second signal quality test (step 913), then the controller 701 proceeds to apply a third signal quality test (step 917). If the collected data does not pass the third signal quality test (step 919), then a third adjustment is applied to the excitation signal (step 921) and the data acquisition is repeated (step 909). However, if the collected data passes all three signal quality tests, then the controller 701 proceeds to the next data acquisition step or, if all data has been collected, the controller 701 proceeds to apply the applicable post processing routines to the collected data (e.g., to populate the MIMO SRF matrix) (step 923).

In some implementations, the controller 701 is configured to perform each test serially, such that the controller 701 proceeds to the second signal quality test only if the collected data passes the first signal quality test and, similarly, proceeds to the third signal quality test only if the collected data passes both the first signal quality test and the second signal quality test. However, in other implementations, the controller is configured to perform each test in parallel, such that the controller 701 proceeds to the second signal quality test regardless of whether the collected data has passed the first signal quality test (as indicated by the dashed line between step 907 and step 911 in FIG. 8) and similarly proceeds to the third signal quality test regardless of whether the collected data has passed the first and/or second data quality test (as indicated by the dashed line between step 915 and step 917 in FIG. 8). In some implementations, the controller 701 is configured to apply the multiple signal quality tests as a combination of serial and parallel test. For example, in some implementations, the controller 701 may be configured to perform both the first signal quality test (step 903) and the second signal quality test (step 911) on the collected data regardless of whether the collected data passes the first signal quality test or the second signal quality test, but is configured to perform the third signal quality test (step 917) only if the collected data passes the second signal quality test (or alternatively, in some implementations, only if the collected data passes both the first and second signal quality test).

Finally, in some implementations, the controller 701 may be configured to apply the same type of signal adjustment regardless of which signal quality test is failed (e.g., the first excitation signal adjustment (step 907), the second excitation signal adjustment (step 915), and the third excitation signal adjustment (step 921) are the same type of signal adjustment). However, in other implementations, the controller 701 is configured to apply a different type of signal adjustment to the excitation signal depending on which signal quality test is failed. For example, the controller 701 may be configured to change the excitation signal from a random signal to a logarithmic sweep signal (as discussed below in reference to FIG. 13B) in response to determining that the collected data does not pass the first signal quality test and to apply a low-pass (or high-pass) filter to the excitation signal (as discussed below in reference to FIG. 13C) in response to determining that the collected data does not pass the second signal quality test. Accordingly, in some implementations, in response to determining that the collected data has failed both the first and second signal quality tests, the controller 701 is configured to both (1) change the excitation signal to a logarithmic sweep signal and (2) apply the low-pass (or high-pass) filter to the logarithmic sweep excitation signal.

In various implementations, the data quality test (e.g., the signal quality tests in the example of FIG. 8) may include data processing and quality assurance steps in which the data quality of each individual SIMO or SISO experiment sequence is verified, each individual SIMO or SISO experiment may be transformed into some sort of SRF, the individual SRFs may temporarily be arranged in one or more partial MIMO matrices, and/or data quality of the overall MIMO matrix (or multiple partial MIMO matrices) is verified. In implementations where the individual SRFs are temporarily arranged into one or more partial MIMO matrices, the controller 701 may also be further configured to perform additional data transformation, manipulation, or augmentation routines involving numerical, model-based, and/or hybrid approaches. Such approaches may include, for example, geometric reduction and/or transformation techniques (e.g., Finite Difference Approximation and Virtual Point Transformation), data manipulation techniques to numerically alter the boundary conditions under which the SRF experiment was conducted (e.g., dynamic sub-structuring for coupling and decoupling), data dimensionality reduction and/or regularization techniques (e.g., Principal Component Analysis, Truncated or Tikhonov regularized Singular Value Decomposition), and augmentation techniques to model additional data at degrees of freedom (e.g., locations on the device/structure-under-test) at which no physical measurement was taken (e.g., System Equivalent Model Mixing (SEMM) techniques where experimental data is combined with other measurement/simulated data). Some specific examples of metrics and calculations that may be used, in various implementations, to ensure high-quality experimental data during the automated SRF measurement process are outlined in the table of FIG. 9. However, some implementations will include fewer calculations, metrics, and tests than those listed in the table of FIG. 9 and some implementations may include other calculations, metrics, and tests in addition to or instead of those listed in the table of FIG. 9.

In some implementations, the controller 701 is configured to perform the data processing and quality assurances steps using additional data (e.g., data that is specific to the test setup). Such data may include, for example, geometric relations between excitation and response DoFs (e.g., Euclidean distance, Euler angles, etc.), meta-data relevant to the experiment, and/or meta-data required for bookkeeping purposes (e.g., data required to arrange MIMO matrices).

Figure 10:
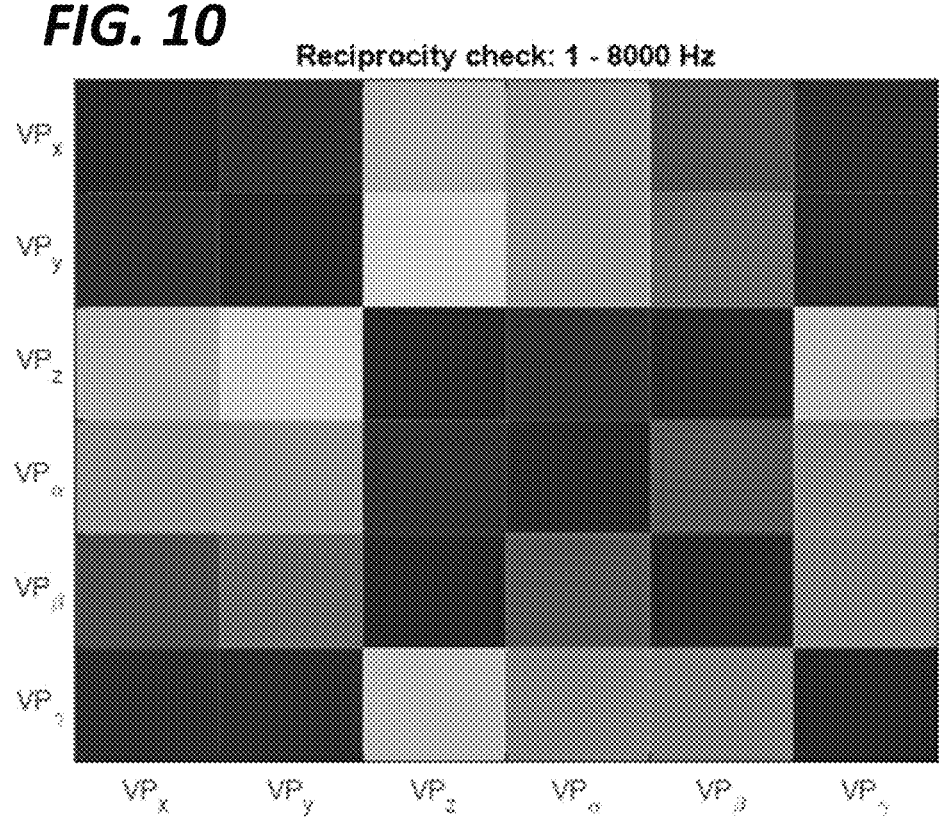
FIG. 10 is a graph of SRF reciprocity data collected during a quality test of the method of FIG. 8.
Figure 12:
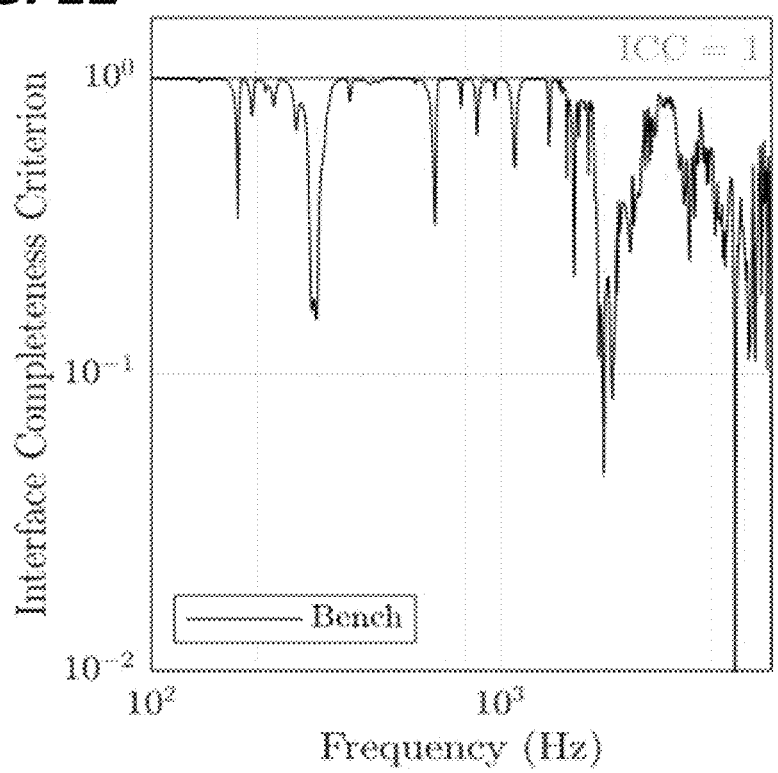
FIG. 12 is a graph of interface completeness criterion (ICC) data collected during a quality test of the method of FIG. 8.
Figure 11:
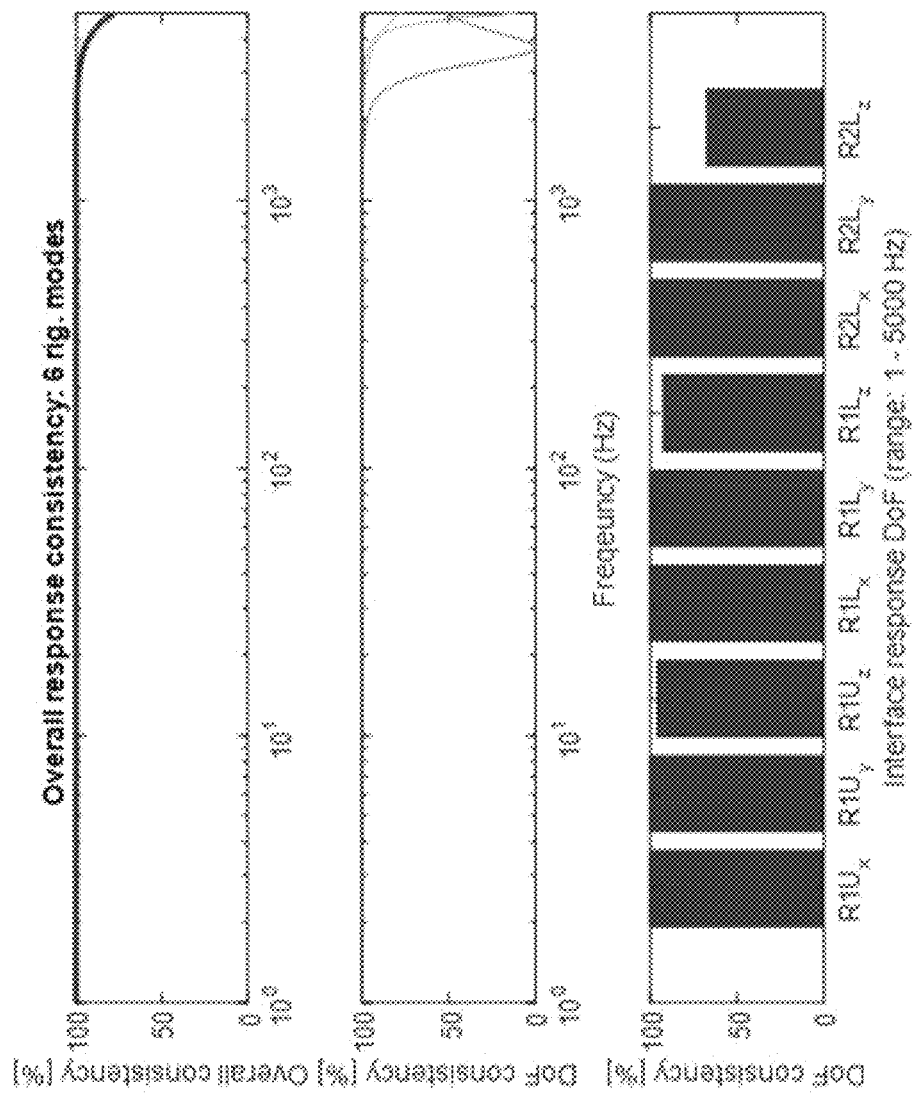
FIG. 11 is a series of graphs of response consistency data collected during a quality test of the method of FIG. 8.

In various implementations, the analysis results of the data processing and quality assurance steps applied by the controller 701 may or may not be provided as feedback to the user during the automated SRF measurement process (e.g., via a display screen of the user interface 707). In implementations where feedback of the quality tests is provided to the user, the results may be summarized in various ways ranging, for example, from single numerical values to sophisticated graphical representations of data quality to aid users in interpreting individual and/or overall data quality. FIGS. 10, 11, and 12 illustrate examples of mechanism for displaying data quality feedback information to a user via the display screen of the user interface 707.

FIG. 10 illustrates an example of a graph that may be displayed to a user via the display screen of the user interface 707 indicating SRF reciprocity between automated measurement locations as a single value matrix representation. In the example of FIG. 10, the relative quality of data is indicated by the relative darkness of each displayed square (e.g., darker colored squares represent higher quality data). In some implementations, this analysis is part of the set quality test (FIG. 7, step 815).

FIG. 11 illustrates an example of a series of graphs that may be displayed to the user via the display screen of the user interface 707 indicating measures of response consistency. The top graph indicates overall response consistency as a frequency spectrum, the middle graph illustrates individual specific response consistency as frequency spectra, and the bottom graph illustrates specific response consistency as single values. In the graphs of FIG. 11, values closer to 100% indicate higher quality data. In some implementations, the controller 701 may be configured to display all three graphs of FIG. 11 on the screen simultaneously while, in other implementations, the controller 701 may be configured to display only one or two of the graphs of FIG. 11 and/or to display different graphs of FIG. 11 selectively and interchangeably.

FIG. 12 illustrates an example of a graph that may be displayed to the user via the display screen of the user interface 707 indicating interface completeness criterion (ICC) as a frequency spectrum. Values close to one ("1") indicate frequencies at which the MIMO system is well described and that should be further analyzed if the measurement is plausible.

As discussed above in reference to FIGS. 8 and 9, in some implementations, the controller 701 is configured to adjust the applied excitation signal in order to further improve data quality. In some implementations, the controller 701 is configured to attempt to apply an excitation signal that imparts a force input to the device/structure-under-test in such a way that desired vibration output is obtained satisfying as many of the defined quality conditions as possible. Adjustments to the excitation signal may include, for example, (1) duration (longer measurements may provide clearer (e.g., less noisy) results due to averaging effects, but increase the total data acquisition time), (2) type (e.g., impact/transient excitation, burst/random excitation, pseudo random excitation, swept sine, stepped sine, etc.), (3) magnitude (e.g., magnitude scaling of overall signal or time/frequency-dependent magnitude scaling), (4) frequency content (e.g., frequency-dependent filtering/equalization (for example, amplification of the excitation at lower frequencies to obtain sufficient signal-to-noise ratio (SNR) in resilient coupled assemblies)), or (5) a combination of some or all of the above (e.g., transmission loss compensation via transmissibility filtering).

In some implementations, the controller 701 is configured to determine whether the applied excitation signal requires an adjustment based on the following information: (1) feedback-free adjustment using integrated "exciter calibration database," (2) feedback from a connected data acquisition system (DAQ), and/or (3) feedback from the MIMO data processing system. In some implementations, the "exciter calibration database" used by the controller 701 to perform feedback-free adjustments contains information on connected vibratory exciters together with knowledge of which vibratory exciter is currently being operated (e.g., predefined exciter-specific equalization filter is applied to excitation signal in order to linearize exciter output every time an exciter is operated. In some implementations, the DAQ itself may be configured to perform internal data quality checks to analyze the most recent individual SIMO/SISO experiment and the results are communicated to the controller 701 through appropriate protocols. Finally, in some implementations, the controller 701 (or a separate MIMO data processing system) is configured to process and analyze individual SIMO/SISO measurements and/or the overall set of measurements recomposed as one or more MIMO matrices. As discussed above, in some implementations, systems such as illustrated in FIGS. 4 through 6 are configured to address individual and overall data quality/consistency simultaneously.

FIGS. 13A through 13D illustrates an example of a testing system (e.g., the system of FIGS. 4 through 6) configured to adjust an applied force (X) (i.e., the actual vibration applied to the device/structure-under-test in response to the excitation signal) in response to a sensed vibration response (Y). The testing system in this example is configured to apply a signal quality test to evaluate signal-to-noise ratio (SNR). The example of FIG. 13A includes a separate MIMO data processing system 1301 configured to analyze the collected data and a control logic 1303 configured to adjust the excitation signal in response to feedback received by the control logic 1303 from the MIMO data processing system 1301. In some implementations, a single controller (e.g., controller 701) may be configured to provide the functionality of both the MIMO data processing system 1301 and the control logic 1303 as described in this example. In other implementations, the controller (e.g., controller 701) may be configured to provide the functionality of the control logic 1303 and the data acquisition system 509/603 may be configured to provide the functionality of the MIMO data processing system 1301. Other combinations of logic components and distributions of functionality are also possible in other implementations.

Figure 13A:
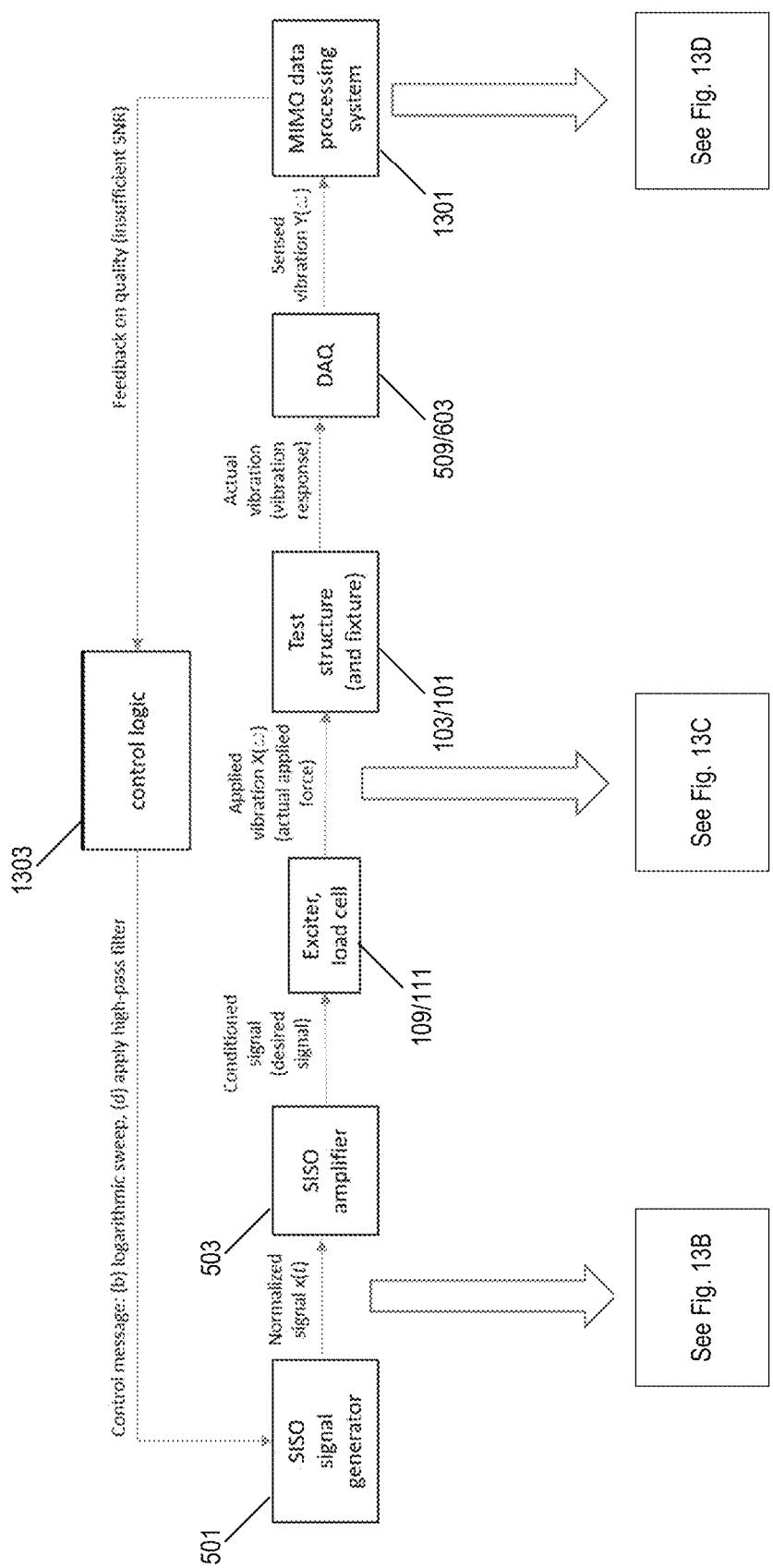
FIG. 13A is a schematic diagram of an example of adjusting an applied excitation signal during the method of FIG. 7 based on the result of a quality test of the method of FIG. 8.
Figure 13B:
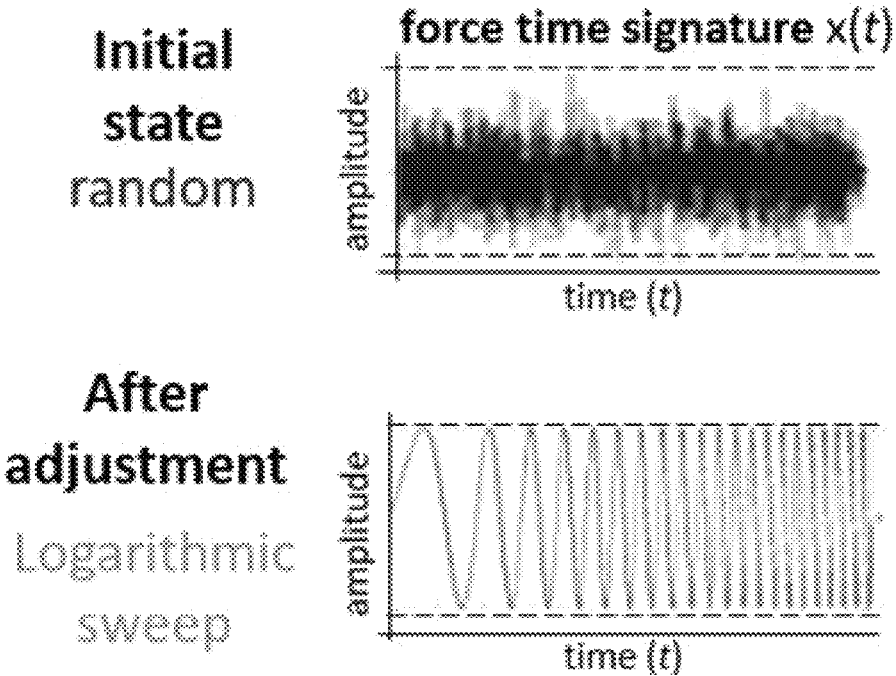
FIG. 13B is a graph of an applied excitation signal before and after an adjustment to the excitation signal based on the result of a quality test of the method of FIG. 8.
Figure 13C:
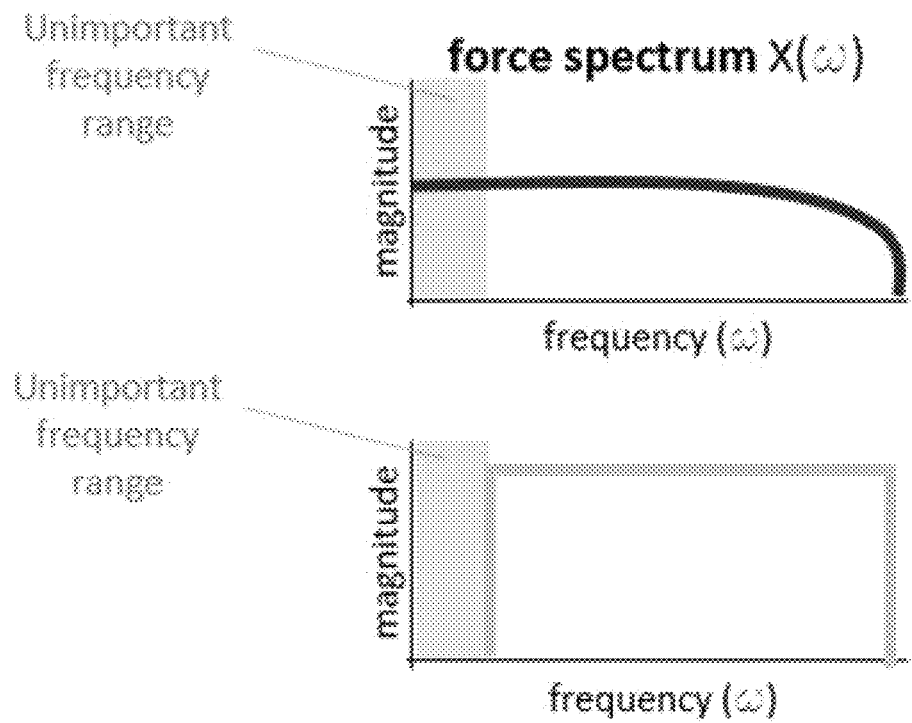
FIG. 13C is a graph of a force spectrum of the applied excitation signal before and after the adjustment to the excitation signal.

As illustrated in FIG. 13A (and as described in the other examples above), the SISO signal generator 501 is configured to generate an excitation signal in response to control signals received from the control logic 1303, which, in this example, is configured to normalize the excitation signal output for each individual vibratory exciter 109 (i.e., an excitation signal with an amplitude of +/−1). Examples of normalized signals x(t) generated by the SISO signal generator 501 is illustrated in FIG. 13B. The normalized excitation signal x(t) is then provided as input to the SISO power amplifier 503 which, in turn, outputs a conditioned excitation signal that is routed to a vibratory exciter 109. The vibratory exciter 109 imparts a vibratory excitation force x(t) into the device/structure-under-test and the actual vibration is measured by the corresponding load cell 111. Examples of the actual applied vibration X as measured by the load cell 111 are illustrated in FIG. 13C in a frequency domain representation (X($\omega$)). The applied force transmits through the device/structure-under-test 103 and the actual vibration at another location on the device/structure-under-test is routed to a data acquisition system 509/603 and a data input indicative of the sensed vibration y(t) is collected by or transmitted to the MIMO data processing system 1301. Examples of the sensed vibration Y as measured by the response sensor 107 are illustrated in FIG. 13D in a frequency domain representation (i.e., response spectrum Y($\omega$)).

In the example of FIG. 13A, the MIMO data processing system 1301 is configured to apply one or more signal quality tests to the captured data including at least one signal quality test designed to determine whether the collected data exhibits a sufficient signal-to-noise ratio. The MIMO data processing system 1301 transmits feedback to the control logic 1303 indicative of the outcome of the signal quality test(s) (i.e., wherein SNR is sufficient) and, based on the received feedback, the control logic 1303 determines whether an adjustment to the excitation signal is appropriate.

Figure 13D:
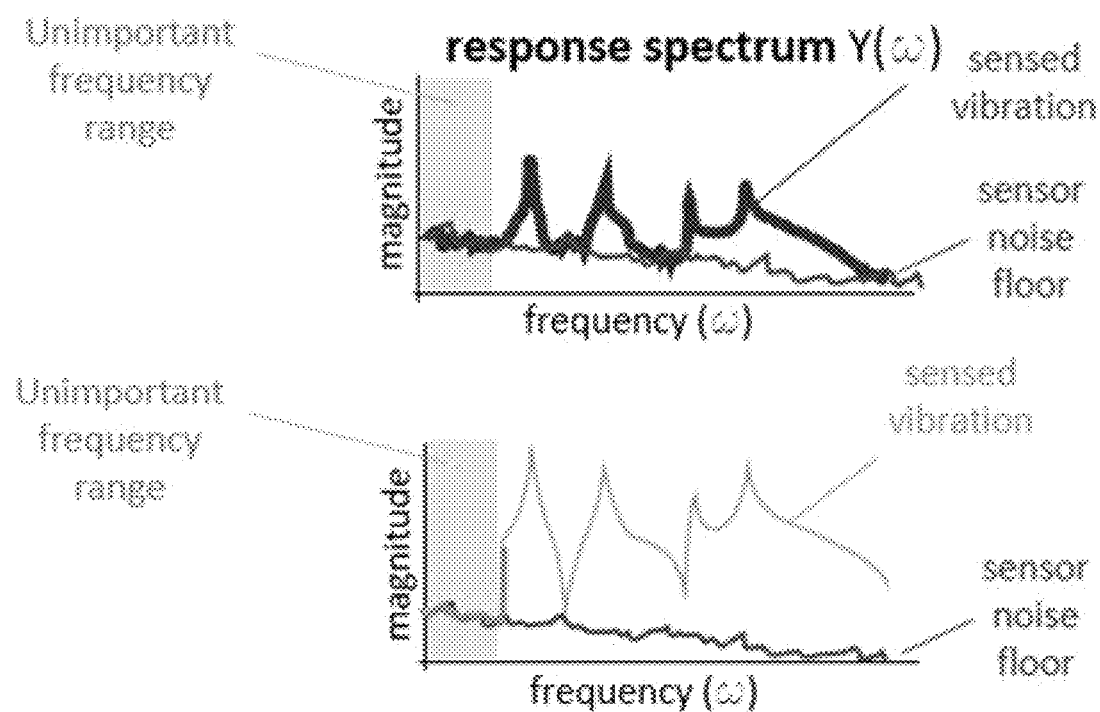
FIG. 13D is a graph of the response spectrum before and after the adjustment to the excitation signal.

To demonstrate the adjustment mechanism in the example of FIG. 13A in more detail, FIGS. 13B through 13D illustrate examples of various signals both before and after an adjustment is applied to the excitation signal by the control logic. In FIG. 13B, the top graph illustrates the original excitation signal and the bottom graph illustrates the adjusted excitation signal. In FIG. 13C, the top graph illustrates the force spectrum $X(\omega)$ of the actual force applied to the device/structure-under-test (as measured by the load cell 111) in response to the original excitation signal and the bottom graph illustrates the force spectrum $X(\omega)$ of the actual force applied in response to the adjusted excitation signal. In FIG. 13D, the top graph illustrates the response spectrum $Y(\omega)$ based on the output of the response sensor 107 when the original excitation signal is applied and the bottom graph illustrates the response spectrum based on the output of the response sensor 107 when the adjusted excitation signal is applied.

The original excitation signal (as illustrated in the top graph of FIG. 13B) is a random (broad-band white-noise) time signature x(t). The applied force in response to this original excitation signal (as illustrated in the top graph of FIG. 13C) is characterized by a medium-magnitude, broad-band frequency spectrum $X(\omega)$ with a noticeable drop in force at the higher frequency range. In this example, the excited frequency range extends to a low-frequency region of frequencies that are not relevant to this particular experiment (denoted in FIG. 13C as the "unimportant frequency range"). This low-frequency excitation component, however, may limit the ability of the vibratory exciter 109 to provide high-energy output within a more relevant frequency region (e.g., the higher frequency range where the signal in the top graph of FIG. 13C begins to decline). In practice, the illustrated force drop towards high frequencies may result from internal damping due to exciting all frequencies simultaneously (e.g., using the random, white-noise excitation signal). Thus, the vibratory exciter 109 is trying to overcome large strokes at low frequencies while simultaneously superimposing small stroke movements at high frequencies. The applied vibrations cause the linear and time-invariant (LTI) device/structure-under-test 103 to vibrate in response to the exerted forces, which is then sensed by the response sensor(s) 107.

In the top graph of FIG. 13D, the spectrum of the sensed response vibrations $Y(w)$ are plotted together with the spectrum of a sensor noise floor. In some implementations, the sensor noise floor may be measured in the same setup when no excitation is applied to the device/structure-under-test 103. As discussed above, the "quality" of the sensed vibrations can be analyzed in various different way. However, in this example, the top graph of FIG. 13D illustrates signal-to-noise problems at regions where the sensed vibration spectrum $Y(\omega)$ is close to the sensor noise floor. In some implementations, a data quality condition may be defined as a sensed signal that is at least 10 dB higher than the sensor noise floor at this frequency. However, in the example of the top graph of FIG. 13D, the sensed vibration $Y(\omega)$ suffers from insufficient signal-to-noise distance at the structure's expected anti-resonances and generally at high frequencies due to relatively low force excitation (as a result of the vibratory exciter's high internal damping).

In this example, the MIMO data processing system 1301 is configured to analyze the sensed vibrations to identify the insufficient data quality (i.e., insufficient SNR) and transmits a feedback message to the control logic 1303. In response the control logic 1303 initiates an automated adjustment of the applied vibrations to mitigate the detected signal quality issue. In some implementations, the control logic 1303 is configured to identify an appropriate adjustment to the excitation signal based on the detailed feedback on the frequency ranges in which excitation is insufficient together with additional meta-data provided by the user in regards to the targeted frequency range and/or time requirements for the measurement(s).

In this particular example, the configuration of the control logic 1303 causes it to determine, based on the feedback from the MIMO data processing system 1301, that the "type" of the excitation signal should be changed from the random broad-band white-noise excitation signal (illustrated in the top graph of FIG. 13B) to a logarithmic sweep signal (illustrated in the bottom graph of FIG. 13B). Doing so will cause the vibratory exciter to generate vibration at a single frequency at a time, thus preventing the vibratory exciter from internal damping while maximizing the force output at the same time. In this example, a logarithmic frequency sweep is used instead of a linear sweep in order to provide sufficient time for the device/structure-under-test 103 to respond to the applied vibrations, especially for the more difficult to excite lower frequency range.

In this example, the configured of the control logic 1303 also causes it to determine, based on the feedback from the MIMO data processing system 1301, that an additional adjustment of the excited frequency range may be appropriate (e.g., to prevent the vibratory exciter from damage due to excessive stroke at low frequencies beyond the frequency range of interest and/or to minimize the duration of the measurement). In this example, this is achieved by causing the SISO signal generator 501 to apply a high-pass filter during the signal generation process. This high-pass filter prevents the vibratory exciter from being operated at low frequencies and, as illustrated in the bottom graph of FIG. 13C, the applied force spectrum $X(w)$ after the adjustment to the excitation signal is now optimized in favor of the frequency range of interest. It is also noted that the same signal amplification is sufficient to achieve significantly higher exciter force output due to operating the exciter at one frequency at a time. Also, in some implementations, a similar filter could be applied as a low-pass filter to cut off higher frequencies in order to avoid high shaker temperatures during continuous operation. Other adjustments to the force signal x(t) may include changes of the signal amplitude. For example, the sine-wave signature of the signal in FIG. 13B can be amplified or attenuated at certain frequencies to "shape" the force characteristics $X(\omega)$ in FIG. 13C. In some implementations, the signal generator is configured to apply these adjustments. This allows, for example, to apply higher forces at low frequencies, which may be helpful, for example, for structures that are coupled using rubber isolators where high excitation energy is required to cause a low-frequency responses signal on the structure due to the energy dissipation at the rubber isolator.

The applied vibration spectrum $X(\omega)$ in response to the adjusted excitation signal results in a better overall excitation of the device/structure-under-test as indicated by the bottom graph of FIG. 13D which exhibits noticeably higher vibration response spectrums $Y(\omega)$ with increased separation between the sensed signal and the sensor noise floor. Accordingly, when the MIMO data processing system 1301 received the updated sensed signal and applies the same signal quality test, the output of the signal quality test indicates that the signal quality issue (i.e., insufficient SNR)

has been sufficiently mitigated and even the anti-resonances of the device/structure-under-test (i.e., the smallest measured amplitude levels of the response signal) are clearly separated from the sensor noise floor. The higher quality response spectrum together with the measured force spectrum of the applied vibration can now sufficiently be used to determine high-quality SRF between the corresponding excitation and response degrees of freedom (i.e., the corresponding vibratory exciter 109/response sensor 107 combinations).

In the example of FIGS. 13A through 13D, the excitation signal adjustment strategy is fully automated and is performed by the MIMO data processing system 1301 and the control logic 1303 (e.g., both implemented in the controller 701 in some implementations) without any direct input from a user. However, in some implementations, the control logic 1303 may be configured to output feedback to a user indicative of the quantified signal quality and to receive user feedback indicating adjustments to the excitation signal. In some such implementations, the control logic 1303 may be configured to prioritize this direct user feedback over the automated adjustment strategies.

Similar excitation signal adjustment strategies may be implemented in some implementations based on feedback received while adjusting the applied vibration in consideration of one or more data-quality-indicating criteria based, for example, on (i) the applied vibration (e.g., force) only, (ii) the sensed vibration (e.g., acceleration) only, or (iii) both the applied vibration and the sensed vibration together. In some implementations, the output of the SISO signal generator 501 or the SISO power amplifier 503 is utilized as the basis to adjust the applied vibration downstream, for example, using numerical data representing the normalized or conditioned desired signal output together with additional performance relevant criteria (e.g., the amplifier's frequency response function or the vibratory exciter's "output vibration"-to-"input current" transfer function) to estimate and adjust the expected applied vibration.

Accordingly, the systems and methods described herein facilitate decomposing complex experimental MIMO vibration tests into multiple sequentially performed SIMO or SISO SRF experiments following a fully automated process as illustrated in the example of FIG. 7. After an initial test system set up—including instrumenting the device/structure-under-test 103 and/or specifically designed fixtures 101—the controller 701 is able to perform all experiments including data quality checks, complex data-based decision making, and data post-processing autonomously. For example, a MIMO SRF vibration test according to one implementation may include the following process control steps: (1) system set up and instrumentation (one-time setup; special fixtures may be used for ease of measurement), (2) routing of the excitation hardware (vibratory excitation sources and associated load cells and/or employment of additional/alternative methods to determine the actual force excitation), (3) routing of response sensor hardware and/or employment of additional/alternative methods to determine the actual response of the test structure to the imparted force excitation, (4) parameterization of the data acquisition (DAQ) system according to the current SIMO or SISO experiment sequences (e.g., sensor calibration, dynamic range, sampling frequency, sampling duration, filtering, trigger, etc.), (5) collection of all SIMO or SISO experiment sequence data, (6) data post-processing of current SIMO or SISO experiment sequence including (in some implementations) quality assurance methods and associated process flow control (e.g., repeated experiment with improved excitation strategy or data collection parameterization if quality assurance methods indicate poor results), (7) post-processing (and storage) of successful SIMO or SISO SRF experiment data and initiation of subsequent SIMO or SISO experiment, and (8) post-processing and provision of recomposed/updated MIMO SRF measurement (additional numerical/model-based/hybrid data manipulations/transformations may be performed).

Accordingly, various implementations of the systems and methods described herein may provide the following advantages over other MIMO testing approaches: (1) one signal generator and power amplifier may be shared by all exciters, (2) the number of excitation DoFs and response DoFs are not limited by DAQ channel count, (3) any excitation signal (transient, continuous, etc.) can be used while ensuring optimal phase-reference and improved signal-to-noise ratio (SNR), (4) DAQ may employ auto-calibration process to adjust measurement range for each employed excitation, (5) challenging measurements may be split into multiple parts to allow exciters to cool down between measurements (data post-processing methods may recompose sectioned measurements), (6) challenging measurements may be conducted subsequently with different excitation sources by control strategy (data post-processing methods may be used to recompose/merge different data (e.g., different exciters for different frequency ranges)), (7) reciprocal calibration methods may be used to perform in-situ exciter output calibration and/or to reduce the number of required exciter output sensors (e.g., load cells), (8) detection of local non-linearities using appropriate signal generation and/or post-processing methods, and (9) signal generation independent of number of SRFs to be determined.

Other features and advantages of the invention are set forth in the following claims.

What is claimed is:

1. A method of automated MIMO force-response characterization of a structure-under-test, the method comprising:

coupling a plurality of exciter devices to the structure-under-test, each exciter device of the plurality of exciter devices being coupled at a different one of a first plurality of fixed locations relative to the structure-under-test;

coupling a plurality of response sensors to the structure-under-test, each response sensor of the plurality of response sensors being coupled at a different one of a second plurality of fixed locations relative to the structure-under-test;

operating an exciter router to iteratively couple an excitation signal input to each exciter device of the plurality of exciter devices, wherein coupling the excitation signal input to an exciter device causes the exciter device to impart an excitation force to the structure-under-test based on the excitation signal input;

collecting sensor data from the plurality of response sensors while the excitation force is imparted to the structure-under-test, wherein collecting the sensor data includes collecting a first set of sensor data from each response sensor of the plurality of response sensors while the excitation force is imparted to the structure-under-test by a first exciter device of the plurality of exciter devices, and collecting subsequent sets of sensor data from each response sensor of the plurality of response sensors while the excitation force is iteratively imparted to the structure-under-test by each additional exciter device of the plurality of exciter devices; and determining a MIMO system response function for the structure-under-test based on the collected sensor data.

2. The method of claim 1, wherein operating the exciter router further includes coupling the excitation signal input to a second exciter device of the plurality of exciter devices after the first set of sensor data has been collected from each response sensor of the plurality of response sensors, and wherein collecting the subsequent sets of sensor data includes collecting a second set of sensor data from each response sensor of the plurality of response sensors while the excitation force is imparted to the structure-under-test by the second exciter device.

3. The method of claim 1, wherein operating the exciter router further includes transmitting an exciter router control signal from an electronic controller to the exciter router, wherein the exciter router control signal causes the exciter router to operate a plurality of switching devices of the exciter router to couple the excitation signal input to one output of a plurality of outputs and to electronically isolate all other outputs of the plurality of outputs from the excitation signal input, and the method further comprising:
operating a load cell router to iteratively couple a plurality of load cells to a data acquisition input channel, wherein the plurality of load cells includes a different load cell corresponding to each exciter device of the plurality of exciter devices, and wherein operating the load cell router includes operating the load cell router to selectively couple the data acquisition input channel to a load cell corresponding to the exciter device to which the excitation signal input is currently coupled; and
determining an actual excitation force applied to the structure-under-test based on a signal received at the data acquisition input channel.

4. The method of claim 1, wherein collecting the sensor data includes collecting the sensor data by a data acquisition system, the data acquisition system including a plurality of signal input channels, wherein each signal input channel of the plurality of signal input channels is coupled to an output of a different one of the plurality of response sensors.

5. The method of claim 1, wherein collecting the sensor data further includes
operating a sensor router to couple a signal input channel of a data acquisition system to an output of a first response sensor of the plurality of response sensors, wherein the sensor router is configured to selectively couple the plurality of response sensors to the signal input channel of the data acquisition system, and
collecting, by the data acquisition system, sensor data from the output of the first response sensor.

6. The method of claim 5, wherein collecting the sensor data further includes
operating the sensor router to sequentially couple the signal input channel of the data acquisition system to each additional response sensor of the plurality of response sensors, and
collecting, by the data acquisitions system, sensor data from an output of each additional response sensors of the plurality of response sensors.

7. The method of claim 6, wherein operating the exciter router further includes coupling the excitation signal input to a second exciter device of the plurality of exciter devices after operating the sensor router to sequentially couple the signal input channel of the data acquisition system to each additional response sensor of the plurality of response sensors.

8. The method of claim 1, wherein collecting the sensor data includes collecting the sensor data while operating the exciter device until a complete set of data is collected including a different data signal measured corresponding to each of a plurality of combination of an exciter device applying the excitation force and a response sensor measuring a response to the force imparted by the exciter device applying the excitation force.

9. The method of claim 1, wherein coupling the plurality of exciter devices to the structure-under-test includes selectively coupling the structure-under-test to a test fixture, wherein exciter devices of the plurality of exciter devices are previously installed at locations on the test fixture.

10. The method of claim 1, wherein determining the MIMO system response function for the structure-under-test includes populating a system response function (SRF) matrix with data collected for each different exciter-sensor combination.

11. A test system for automated MIMO force-response characterization of a structure-under-test, the test system comprising:
a plurality of exciter devices couplable to the structure-under-test;
a plurality of response sensors couplable to the structure-under-test;
a single-input, single-output signal generator configured to generate an excitation signal that is selectively coupled to the plurality of exciter devices;
a single-input, multiple-output exciter router configured to selectively couple the excitation signal from the single-input, single-output signal generator to each exciter device of the plurality of exciter devices, wherein coupling the excitation signal to an exciter device of the plurality of exciter devices causes the exciter device to impart an excitation force to the structure-under-test based on the excitation signal;
a data acquisition system configured to collect sensor data from each of the plurality of response sensors indicative of a sensed response to the imparted excitation force; and
an electronic controller configured to operate the single-input, multiple-output exciter router to
apply the excitation signal to a first exciter device of the plurality of exciter devices until a first set of sensor data is collected by the data acquisition system from each response sensor of the plurality of response sensors while the excitation signal is applied to the first exciter device, and
subsequently apply the excitation signal to each additional exciter device of the plurality of exciter devices until additional sets of sensor data are collected by the data acquisition system from every response sensor of the plurality of response sensors while the excitation signal is iteratively applied to each exciter device of the plurality of exciter devices.

12. The test system of claim 11, wherein the single-input, multiple-output exciter router includes a plurality of switching devices configured to selectively couple an input channel to each of a plurality of output channels while electronically isolating all non-connected output channels, and wherein the single-input, multiple-output exciter router is configured to
receive an exciter router control signal from the electronic controller, and
selectively couple the excitation signal received from the single-input, single-output signal generator at an input channel of the single-input, multiple-output exciter router to one output of a plurality of output channels of the single-input, multiple-output exciter router based on the received exciter router control signal.

13. The test system of claim 11, wherein the data acquisition system includes a plurality of sensor input channels, and wherein each sensor input channel of the data acquisition system is coupled to an output of a different one of the plurality of response sensors.

14. The test system of claim 11, further comprising a multiple-input, single-output sensor router including a plurality of sensor input channels and a signal output channel,
wherein each sensor input channel is coupled to an output of a different one of the plurality of response sensors,
wherein the signal output channel is coupled to a signal input channel of the data acquisition system,
wherein the multiple-input, single-output sensor router is configured to selectively couple an individual sensor input channel to the signal output channel while electronically isolating all non-connected sensor input channels, and
wherein the data acquisition system is configured to collect the sensor data from each of the plurality of response sensors by receiving the sensor data from the signal output channel of the multiple-input, single-output sensor router while the multiple-input, single-output sensor router iterative couples each sensor input channel to the signal output channel.

15. The test system of claim 11, wherein the electronic controller is configured to operate a multiple-input, single-output sensor router until a complete set of data is collected including a different data signal measured corresponding to each of a plurality of combinations of a response sensor measuring a response to the force imparted by a different exciter device applying the excitation force.

16. The test system of claim 11, further comprising a test fixture, wherein the structure-under-test is selectively couplable to the test fixture, and wherein the plurality of exciter devices are installed at locations on the test fixture such that each exciter device is coupled to the structure-under-test when the structure-under-test is coupled to the test fixture.

17. The test system of claim 11, wherein the electronic controller is further configured to determine a system response function for the structure-under-test by populating a system-response-function (SRF) matrix with sensor data collected for each of a plurality of different exciter-sensor combination.

18. A test system for automated MIMO force-response characterization of a structure-under-test, the test system comprising:

a single-input, multiple-output exciter router including an input channel coupled to receive an excitation signal input and a plurality of excitation signal output channels each coupled to a different one of a plurality of exciter devices;
a data acquisition system configured to collect sensor data from a plurality of response sensors indicative of a response sensed by the plurality of response sensors, the response associated with an excitation force imparted on the structure-under-test; and
an electronic controller configured to controllably operate the single-input, multiple-output exciter router to cause the single-input, multiple-output exciter router to selectively apply the excitation signal input to an individual exciter device of the plurality of exciter devices while the sensor data is collected by the data acquisition system from each response sensor of the plurality of response sensors,
wherein applying the excitation signal input to the individual exciter device causes the individual exciter device to impart the excitation force to the structure-under-test based on the excitation signal input,
wherein the electronic controller is configured to controllably operate the single-input, multiple-output exciter router to selectively apply the excitation signal input to additional exciter devices of the plurality of exciter devices until the sensor data is collected for each of a plurality of different exciter-sensor combinations, wherein the sensor data for each of the plurality of different exciter-sensors combinations includes sensor data collected from a single response sensor while the excitation force is applied by a single exciter device.

19. The test system of claim 18, wherein the data acquisition system includes a plurality of sensor input channels each coupled to an output of a different one of the plurality of response sensors.

20. The test system of claim 18, further comprising a multiple-input, single-output sensor router including a plurality of sensor input channels each coupled to a different one of the plurality of response sensors and a signal output channel coupled to a signal input channel of the data acquisition system, wherein the electronic controller is configured to controllably operate the multiple-input, single-output sensor router to selectively couple one sensor input channel to the signal output channel while the excitation force is applied to the structure-under-test.

* * * * *